US00RE40973E

(19) United States
(12) Reissued Patent
Nitta et al.

(10) Patent Number: US RE40,973 E
(45) Date of Reissued Patent: Nov. 17, 2009

(54) LIQUID CRYSTAL DRIVER AND LIQUID CRYSTAL DISPLAY DEVICE USING THE SAME

(75) Inventors: Hiroyuki Nitta, Fujisawa (JP); Hiroyuki Mano, Chigasaki (JP); Tsutomu Furuhashi, Yokohama (JP); Isao Takita, Fujisawa (JP); Satoru Tsunekawa, Higashimurayama (JP); Toshio Futami, Mobara (JP), jpx; Makiko Ikeda, Yokohama (JP)

(73) Assignee: Hitachi, Ltd., Tokyo (JP)

(21) Appl. No.: 11/406,488

(22) Filed: Apr. 19, 2006

Related U.S. Patent Documents

Reissue of:
(64) Patent No.: 5,774,106
Issued: Jun. 30, 1998
Appl. No.: 08/464,133
Filed: Jun. 5, 1995

U.S. Applications:
(63) Continuation of application No. 09/324,168, filed on Jun. 2, 1999, now Pat. No. Re. 39,366.

(30) Foreign Application Priority Data

Jun. 21, 1994 (JP) ..... 6-138499
Jul. 22, 1994 (JP) ..... 6-170696

(51) Int. Cl.
*G09G 3/36* (2006.01)

(52) U.S. Cl. ..... 345/98; 345/100; 345/211; 345/89

(58) Field of Classification Search ..... 345/98, 345/100, 211, 89, 91, 93, 94, 96, 97, 209
See application file for complete search history.

(56) References Cited

U.S. PATENT DOCUMENTS 4,591,848 A 5/1986 Morozumi
5,041,823 A 8/1991 Johnson
5,093,655 A 3/1992 Tanioka (Continued)

FOREIGN PATENT DOCUMENTS

| | | |
|---|---|---|
| JP | A-63-074098 | 4/1988 |
| JP | A-03-051887 | 3/1991 |
| JP | 3-260622 | 11/1991 |
| JP | 4-149591 | 5/1992 |
| JP | 4-204689 | 7/1992 |
| JP | 4-309919 | 11/1992 |
| JP | 4-346390 | 12/1992 |
| JP | 5-35216 | 2/1993 |
| JP | 05-134627 | 5/1993 |
| JP | 5-249436 | 9/1993 |
| JP | 6-19428 | 1/1994 |
| JP | 6-95623 | 4/1994 |
| JP | 6-130916 | 5/1994 |
| JP | 7-230264 | 8/1995 |
| JP | 7-319432 | 12/1995 |

OTHER PUBLICATIONS

"HD66310T (TFT–Type LCD Driver for VDT)", *Hitachi LCD Driver LSI Data Book*, pp. 1166–1185, Mar. 1994, published by Hitachi, Ltd.

*Primary Examiner*—Richard Hjerpe
*Assistant Examiner*—Abbas I. Abdulselam
(74) *Attorney, Agent, or Firm*—Antonelli, Terry, Stout & Kraus, LLP.

(57) ABSTRACT

A liquid crystal driver includes a voltage generator for generating gray scale voltages on the basis of reference voltages, and an output device for selecting one gray scale voltage from the generated gray scale voltages in accordance with display data, for applying inversion/non-inversion control to the selected gray scale voltage with respect to an inversion reference voltage on the basis of the selected gray scale voltage, an AC switching signal and the inversion reference voltage, and for outputting different liquid crystal supply voltages for one and the same display data to a liquid crystal panel.

18 Claims, 31 Drawing Sheets

U.S. PATENT DOCUMENTS

| | | | |
|---|---|---|---|
| 5,107,353 | A | 4/1992 | Okumura |
| 5,214,417 | A | 5/1993 | Yamazaki |
| 5,247,376 | A | 9/1993 | Wakai |
| 5,253,091 | A | 10/1993 | Kimura |
| 5,296,847 | A | 3/1994 | Takeda |
| 5,363,118 | A | 11/1994 | Okumura |
| 5,365,250 | A | 11/1994 | Hirashima |
| 5,424,753 | A | 6/1995 | Kitagawa |
| 5,436,747 | A | 7/1995 | Suzuki |
| 5,438,342 | A | 8/1995 | Yamaguchi |
| 5,565,883 | A | 10/1996 | Shimizu |
| 5,602,561 | A | 2/1997 | Kawaguchi |
| 5,604,511 | A | 2/1997 | Ohi |
| 5,648,793 | A | 7/1997 | Chen |
| 5,731,796 | A | 3/1998 | Furuhashi |
| 5,796,380 | A | 8/1998 | Kurematsu |

LIQUID CRYSTAL DRIVER AND LIQUID CRYSTAL DISPLAY DEVICE USING THE SAME

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 5,774,106. The reissue applications are application Ser. Nos. 09/324,168, now U.S. Pat. No. Re39,366; 11/406,488 (the present application); 11/980,700; and 11/980,691; all of which are reissues of U.S. Pat. No. 5,774,106.*

CROSS-REFERENCE TO RELATED APPLICATION

*This application is a continuation reissue application of U.S. reissue application Ser. No. 09/324,168, filed Jun. 2, 1999, now Reissue Patent Re 39,366, which is a reissue application of U.S. Pat. No. 5,774,106, issued Jun. 30, 1998, the subject matter of which is incorporated by reference herein. This application is related to continuation reissue U.S. application Ser. No. 11/980,691, filed Oct. 31, 2007, and continuation reissue U.S. application Ser. No. 11/980,700, filed Oct. 31, 2007, which are continuation reissues of continuation reissue U.S. application Ser. No. 11/406,488, filed Apr. 19, 2006.*

This application is related to application Ser. No. 08/135,357 filed on Oct. 19, 1993, entitled "Liquid Crystal Display Driving Method/Driving Circuit Capable of Being Driven with Equal Voltages" which is assigned to the same assignee as the present application. The contents of application Ser. No. 08/135,537 are incorporated herein by reference.

BACKGROUND OF THE INVENTION

1. Field of the Invention

The present invention relates to a liquid crystal driver and a liquid crystal display device using the same and, particularly, relates to an active matrix type liquid crystal driver and a liquid crystal display device using the same.

2. Description of the Related Art

A conventional liquid crystal driver using a data driver LSI HD66310 described in Hitachi LCD driver LSI databook (Published by Hitachi Ltd., March 1994, pp. 1166–1185) will be explained below.

FIG. 2 is a configuration diagram of the conventional data driver HD66310.

In FIG. 2, the reference numeral 201 designates a data driver; 202, display data transferred from a system thereto; 203, a group of control signals for controlling the data driver; 204, a timing control circuit; 205, a control signal for controlling the timing of latching the display data 202; 206, display data; 207, a display timing signal; 208, a latch address control circuit; 209, a group of latch signals generated by the latch address control circuit 208; 210, a latch circuit for latching the display data 206 successively; 211, display data latched by the latch circuit 210 simultaneously; 212, a latch circuit for latching the display data 211 simultaneously on the basis of the timing signal 207; 213, display data latched by the latch circuit 212; 214, a level shifter for shifting a logic voltage level to a liquid crystal driving voltage level; 215, display data of voltage level shifted by the level shifter 214; 216, a reference voltage for a liquid crystal driving voltage; 217, a liquid crystal driving circuit for generating a liquid crystal driving voltage on the basis of the reference voltage 216; and 218, a group of liquid crystal driving signals for driving a liquid crystal panel.

In FIG. 2, twelve bits of display data 202, which are for four pixels (3 bits for gray scales×4 pixels), are transferred together from the system, so that display data corresponding to 160 pixels (4 pixels×40 times) are latched successively by the latch circuit 210 on the basis of the latch signal 209 generated by the latch address control circuit 208. The thus latched display data 211 corresponding to 160 pixels are further latched simultaneously by the latch circuit 212 on the basis of the timing signal 207 synchronized with a gate selection signal of a scanning driver. The voltage levels of the display data 213 are shifted to liquid crystal driving voltage levels by the level shifter 214, so that the level shifter 214 outputs display data 215. The liquid crystal driving circuit 217 selects voltage levels corresponding to the display data 215 from eight levels V7 to V0 of the reference voltage 216 and outputs the selected voltage levels as a group of liquid crystal driving signals 218. In this manner, display of eight gray scales corresponding to display data can be achieved by driving a liquid crystal panel on the basis of eight voltage levels.

FIG. 3 shows the relation between liquid crystal driving voltage and display brightness. In liquid crystal, display brightness varies correspondingly to a voltage applied to a common electrode. Therefore, display of eight gray scales is achieved by applying eight voltage levels V7 to V0 to the liquid crystal. Further, when voltages which are equal but different in polarity (positive polarity and negative polarity) are applied to the common electrode, the brightness does not change. Generally, in order to prevent the liquid crystal panel from burning, the voltage to be applied thereto is driven to alternate between positive polarity and negative polarity periodically.

FIG. 4 is a configuration diagram of a liquid crystal display device having data drivers in opposite sides of a liquid crystal panel. In FIG. 4, the reference numeral 401 designates an power supply circuit for generating reference voltages for driving liquid crystal; 402, an AC switching signal expressing AC switching timing; 403 and 404, reference voltages obtained by AC switching in different timing; 405, a scanning driver LSI (hereinafter referred to as "scanning driver") for driving gate lines of a liquid crystal panel 411; 406, the gate lines of the liquid crystal panel 411 driven by the scanning driver 405; 407, a data driver for driving data lines arranged in the upper side of the liquid crystal panel 411; 408, the data lines driven by the data driver 407; 409, a data driver for driving data lines arranged in the lower side of the liquid crystal panel 411; 410, the data lines driven by the data driver 409; and 411, the liquid crystal panel.

FIG. 5 shows the timing of an AC switching signal which serves as a reference voltage signal for AC switching outputs in the case where data drivers are arranged in the upper and lower sides of the liquid crystal panel as shown in FIG. 4. The power supply circuit 401 generates an upper data driver reference AC voltage 403 and a lower data driver reference AC voltage 404 in synchronism with the AC switching signal 402. The upper data driver reference AC voltage 403 and the lower data driver reference AC voltage 404 are reversed to each other in the timing of polarity (positive polarity and negative polarity). The scanning driver 405 selects gate lines 406 one line by one line successively and pixels on selected one of the gate lines are driven one pixel by one pixel alternately by the upper and lower data drivers 407 and 409. Accordingly, liquid crystal cells on the gate lines successively driven by the scanning driver 405 can be driven so that liquid crystal cells on each of the gate lines alternate their polarity between positive one and negative one). As a result, the quality of an image on the display is improved.

FIG. 6 is a configuration diagram of a liquid crystal display device having a data driver in one side of a liquid crystal panel. In FIG. 6, the reference numeral 601 designates an power supply circuit for generating a reference voltage for driving liquid crystal; 602, an AC switching signal expressing AC switching timing; 603, a reference AC voltage obtained by AC switching; 604, a scanning driver for driving gate lines of a liquid crystal panel 608; 605, the gate lines of the liquid crystal panel 608 driven by the scanning driver 604; 606, a data driver for driving data lines arranged in the upper side of the liquid crystal panel 608; 607, the data lines driven by the data driver 606; and 608, the liquid crystal panel.

FIG. 7 shows the timing of an AC switching signal which serves as a reference voltage signal for AC switching an output in the case where a data driver is arranged singly in the upper side of the liquid crystal panel as shown in FIG. 6. The power supply circuit 601 generates a reference AC voltage 603 in synchronism with the AC switching signal 602. The scanning driver 604 selects gate lines 605 one by one successively so that selected one of the gate lines is driven by the upper data driver 602. Accordingly, liquid crystal cells on the gate lines successively driven by the scanning driver 604 are driven so that liquid crystal cells on one and the same gate line have the same (positive or negative) polarity. As a result, the quality of an image on the display is deteriorated.

FIG. 8 is a view showing another voltage applying method adapted to the case where the data driver shown in FIG. 6 is used. Although FIG. 7 has shown the case where the reference voltage 603 is supplied as an AC voltage, FIG. 8 shows the case where burning of the liquid crystal panel is prevented by changing both the electric potential Vcom of the common electrode (common electrode drive) and the reference voltage 603. Also in this method, all liquid crystal cells on one and the same gate line have the same (positive or negative) polarity, so that the quality of an image on the display is deteriorated.

Alternate-column inversion drive of the liquid crystal panel has an advantage in that display quality is improved with compared with the case of no use of alternate-column inversion drive, because voltages applied to liquid crystal cells are inverted on alternate columns so that the current flowing in the common electrode at the time of liquid crystal drive becomes smaller. As for the conventional data driver arrangement, therefore, data drivers are arranged in the upper and lower portions of the liquid crystal panel. On the other hand, the liquid crystal display device is on strong demands not only for high quality display but also for small size and light weight. Arrangement of one data driver in a single side makes it easy to reduce size and weight. The arrangement of one data driver in a single side of the liquid crystal panel, however, has a problem that display quality deteriorates compared with the case of alternate-column inversion drive of the liquid crystal panel.

SUMMARY OF THE INVENTION

An object of the present invention is to provide a liquid crystal driver for performing alternate-column inversion drive in which liquid crystal cells are driven so as to be inverted on alternate columns in order to obtain high image quality while one data driver is arranged in a single side of a liquid crystal panel in order to reduce the size and weight of a liquid crystal display, that is, in order to reduce a liquid crystal panel driving circuit for the purpose of high-density mounting, and to provide a liquid crystal display device using the liquid crystal driver.

To achieve the foregoing object, according to an aspect of the present invention, a voltage generating means for generating a plurality of gray scale voltages on the basis of reference voltages and an output means for selecting one gray scale voltage from the generated gray scale voltages correspondingly to display data and for outputting different-polarity liquid crystal supply voltages for one and the same display data in the liquid crystal panel on the basis of the selected gray scale voltage, an AC switching signal and an inversion AC switching signal are provided in a liquid crystal driver.

According to another aspect of the present invention, a level-shift circuit for shifting the level of a digital input signal is provided in a scanning driver so that the level of the digital input signal is shifted by the level-shift circuit to a signal level allowed operate in the inside of the scanning driver.

Alternate-column inversion drive can be achieved by one data driver as long as the aforementioned voltage generating means and the aforementioned output means are used.

Accordingly, the circuit scale of an electric source circuit for generating reference voltages can be reduced.

In addition, because the level-shift circuit provided in the input side of the scanning driver can shift the level of the digital input signal to a signal level allowed to operate in the inside of the scanning driver, the circuit scale of the liquid crystal display can be reduced without necessity of use of any external level-shift circuit.

DESCRIPTION OF THE PREFERRED EMBODIMENTS

Figure 1:
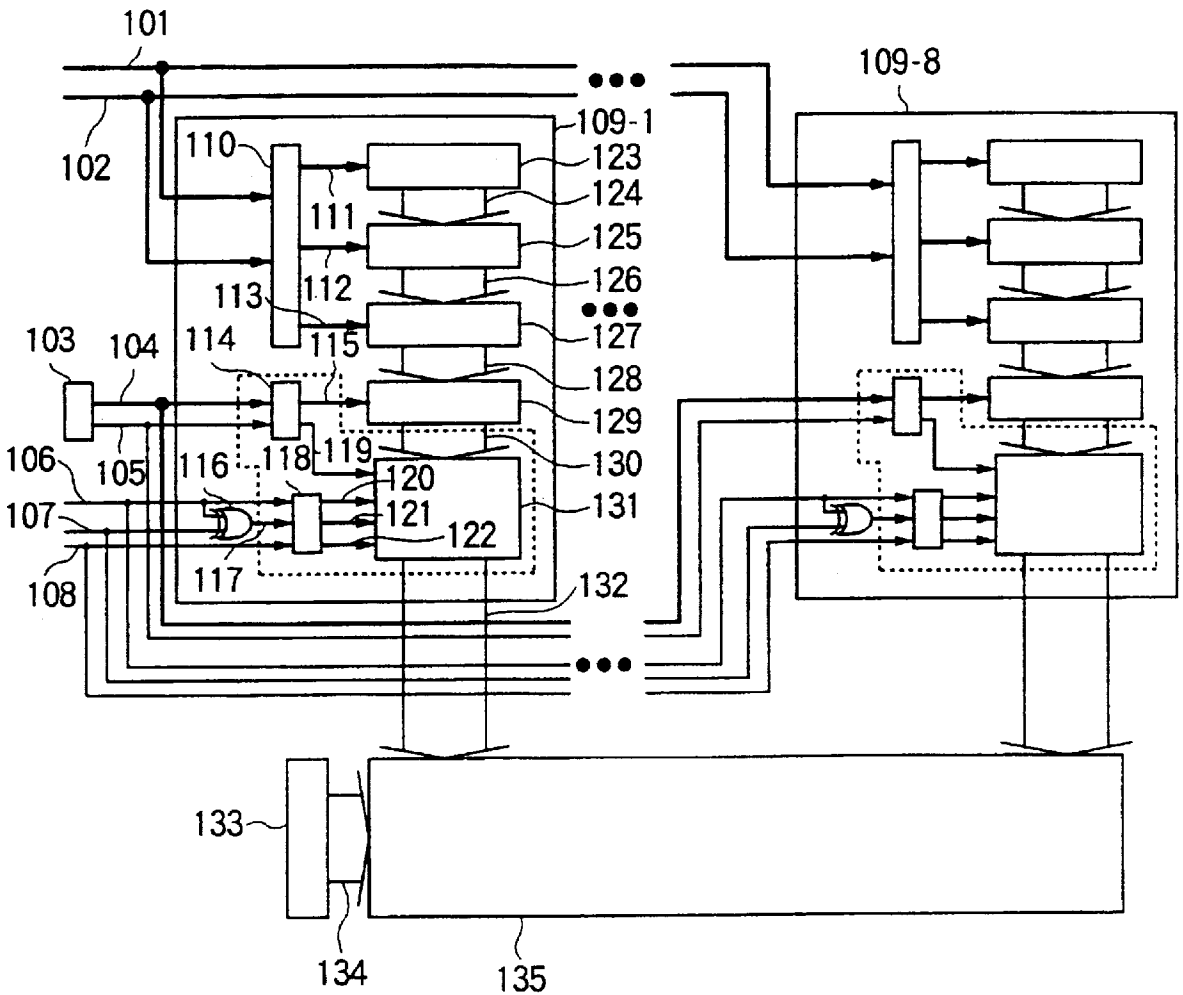
FIG. 1 is a configuration diagram of a liquid crystal display device as a first embodiment of the present invention.
Figure 2:
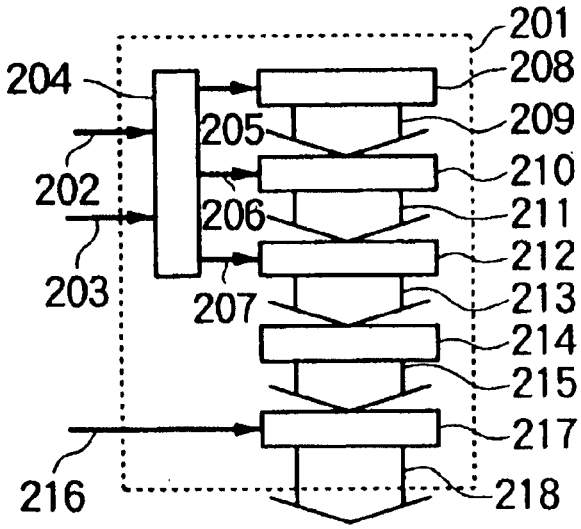
FIG. 2 is a configuration diagram of a conventional liquid crystal driver.
Figure 3:
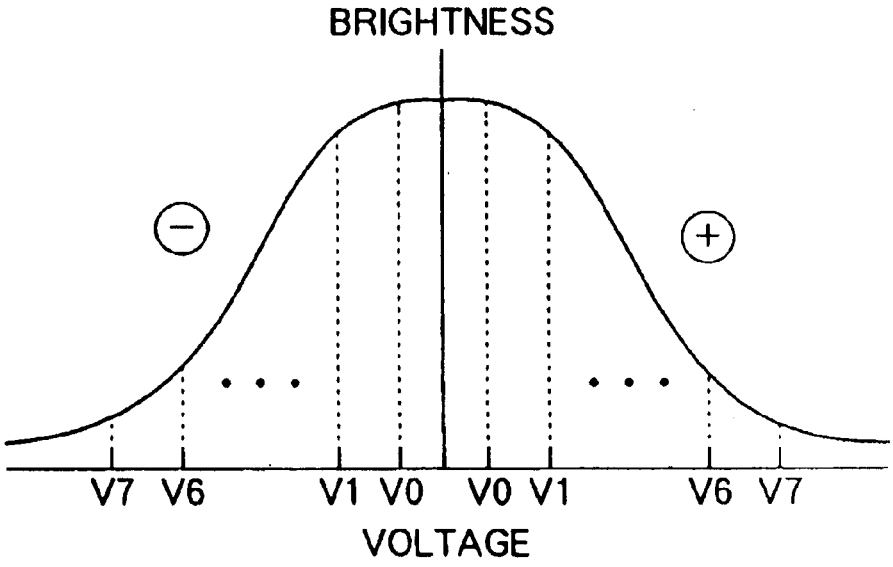
FIG. 3 is a graph showing voltage-brightness characteristic of liquid crystal.
Figure 4:
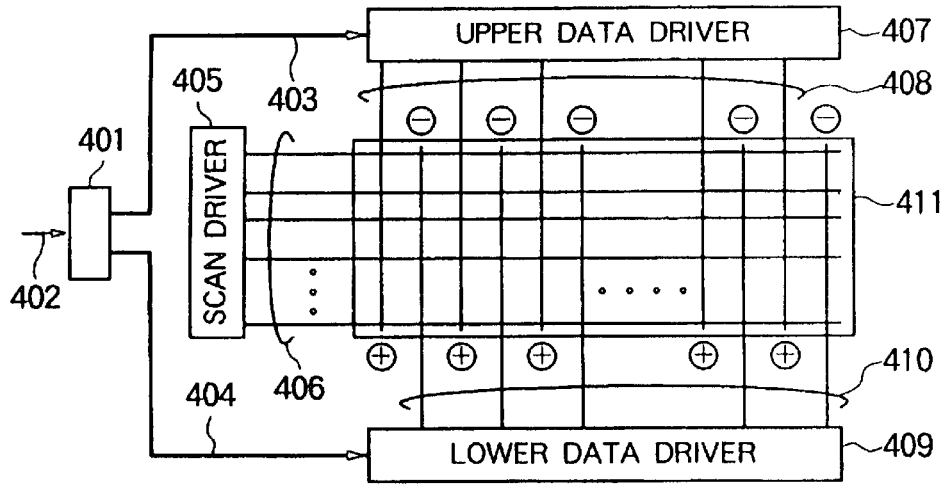
FIG. 4 is a configuration diagram of a conventional liquid crystal display device.
Figure 5:
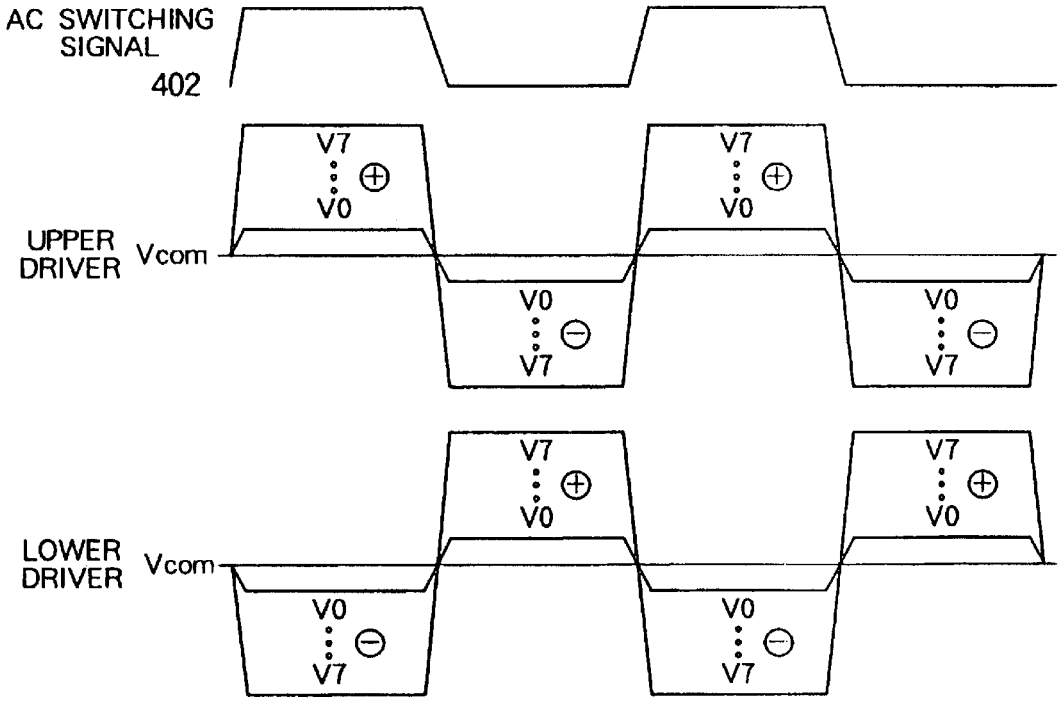
FIG. 5 is a timing chart of liquid crystal reference voltage in the prior art.
Figure 6:
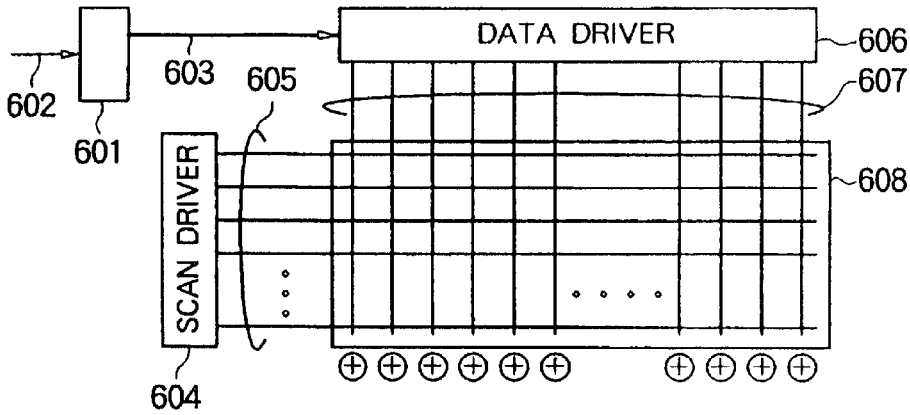
FIG. 6 is a configuration diagram of a conventional liquid crystal display device.
Figure 7:
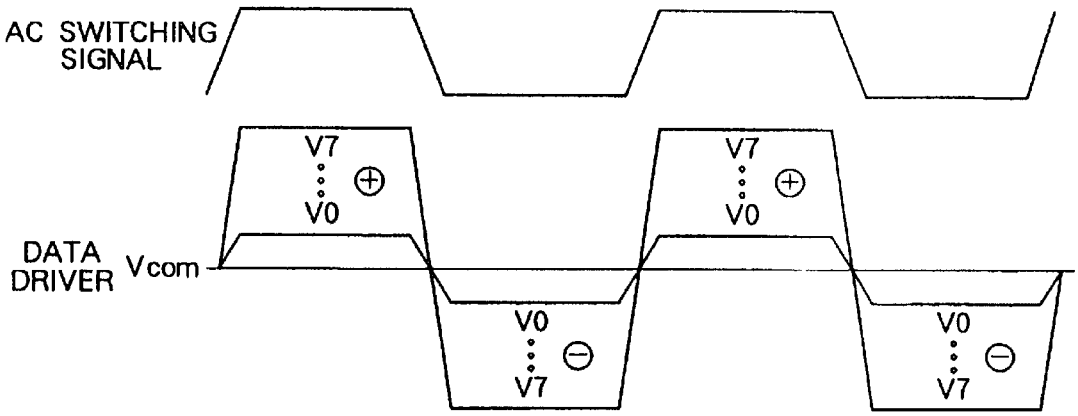
FIG. 7 is a timing chart of liquid crystal reference voltage in the prior art.
Figure 8:
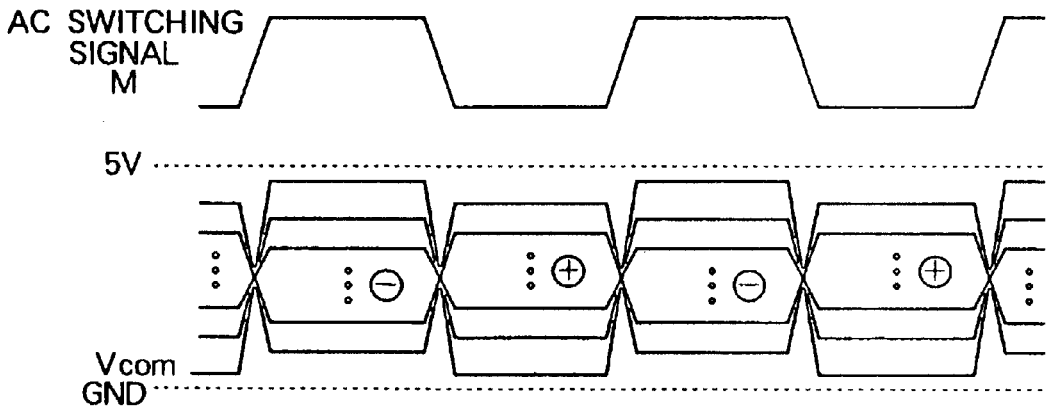
FIG. 8 is a timing chart of liquid crystal output voltage due to common electrode AC drive.

FIG. 1 is a block diagram of a liquid crystal display device according to the present invention. In FIG. 1, the reference numeral 101 designates display data transferred from a system; 102, a group of control signals; 103, an power supply circuit; 104, a group of reference voltage signals of 9 voltage levels to be applied to liquid crystal; 105, an inversion reference voltage for AC inverting a voltage to be applied to liquid crystal; 106, an AC switching signal expressing the timing of AC switching; 107, a selection signal for controlling inversion outputs for each column; and 108, a control signal for performing output circuit driving control. The reference numerals 109-1 to 109-8 designate data drivers for 240 outputs; 110, a timing control circuit; 111, a group of timing signals, 112, display data; 113, a display timing signal expressing display timing; 114, a buffer circuit which receives and buffers the group of reference voltage signals 104 and the inversion reference voltage 105; and 115 and 119, a reference voltage and an inversion reference voltage, respectively, outputted from the buffer circuit 114.

The reference numeral 116 designates an EOR circuit for performing control as to whether the AC switching signal 106 is to be inverted or not to be inverted on the basis of the selection signal 107; 117, an AC switching signal outputted from the EOR circuit 116; 118, a level shifter circuit for converting the level of the control signal 108 into a signal level for a high rate withstand voltage process; 120, a signal outputted from the level shifter circuit 118 by shifting the level of the AC switching signal 106; 121, a signal outputted from the level shifter circuit 118 by shifting the level of the AC switching signal 117; and 122, a signal outputted from the level shifter circuit 118 by shifting the level of the control signal 108. The reference numeral 123 designates a latch address control circuit; 124, a group of latch signals generated by the latch address control circuit 123; 125, a latch circuit for latching the display data 112 successively; 126, display data latched by the latch circuit 125; 127, a latch circuit for latching the display data 126 simultaneously in synchronism with the display timing signal 113; and 128, display data latched by the latch circuit 127.

The reference numeral 129 designates a gray scale voltage generating circuit for generating 64 levels of gray scale voltages from 9 levels of reference voltages 115 and outputting one level of gray scale voltages corresponding to display data; 130, the gray scale voltages generated by the gray scale voltage generating circuit 129; and 131, an output circuit for outputting voltages obtained by inverting or non-inverting the gray scale voltages 130 on the basis of the inversion reference voltage 119 corresponding to the AC switching signals 120 and 121. Output currents of the output circuit 131 are controlled by the control signal 122. The reference numeral 132 designates liquid crystal driving voltages. The reference numeral 133 designates a scanning circuit; 134, gate driving signals successively selected by the scanning circuit 133; and 135, a liquid crystal panel of 640 dots×480 lines.

In FIG. 1, eight data drivers are required because the number of outputs from each of the data drivers 109-1 to 109-8 is 240 and because the resolution of the liquid crystal panel 135 is 640×RGB×480 pixels. The timing control circuit 110 generates control signals inside each data driver on the basis of 18 bits of display data 101 (3 pixels×6 bits for gray scales) and a group of control signals, such as a horizontal synchronizing signal, a display data transfer clock signal, etc., transferred from a system and performs timing control. In the timing control circuit 110, the display data 101 are controlled by the timing inside the data driver so as to be transferred as display data 112 to the latch circuit 125. The latch address control circuit 123 generates a latch signal 124 synchronized with the display data 112 from the control signal group 111 outputted from the timing control circuit 110 on the basis of the timing inside the data driver, so that the display data 112 are latched by the latch circuit 125 successively.

Each of the latch circuits 125 has 240 outputs (6 bits per one output) so that display data corresponding to one horizontal line can be latched successively in the data drivers 109-1 to 109-8. The display data 126 thus latched by the latch circuits 125 correspondingly to one horizontal line are further latched simultaneously by the latch circuits 127 on the basis of the display timing signal 113 synchronized with the gate selection signal 134 outputted from the scanning circuit 133. Each of the latch circuits 127 has 240 outputs (6 bits per one output) so that display data corresponding to one horizontal line can be latched simultaneously in the data drivers 109-1 to 109-8. The display data 128 thus latched by the latch circuits 127 are transferred to the gray scale voltage generating circuits 129. The electric source circuit 103 generates 9-level reference signals 104 for generating gray scale voltages and an inversion reference voltage 105 for AC switching. Each of the buffer circuits 114 buffers the reference voltages 104 and the inversion reference voltage 105 supplied from the power supply circuit 103 and supplies these voltages as reference voltage 115 and inversion reference voltage 119 to the gray scale voltage generating circuits 129 and the output circuit.

The gray scale voltage generating circuit 129 generates 64 levels of gray scale voltages from the reference voltages 115, selects one level of gray scale voltages corresponding to display data for each output and sends the selected voltage level to the output circuit 131. The AC switching signal 106 is a signal for designating the timing of AC switching. The selection signal 107 is a signal for selecting whether the timing of AC switching is to be changed or not to be changed for every output. The AC switching signal 117 is a signal obtained by inverting or non-inverting the AC switching signal 106 correspondingly to the selection signal 107. The control signal 108 is a signal for performing driving control of the output circuit 131. The input signal levels of the display data 101, control signal group 102, reference voltage 104, inversion reference voltage 105, AC switching signal 106, selection signal 107 and control signal 108 are all in a range of from 0 V to 5 V. On the other hand, the level of the liquid crystal driving voltage requires about 15 V for the purpose of AC drive.

Accordingly, it is necessary to use a high rate withstand voltage process (rate voltage: 15 V) as the output circuit for outputting liquid crystal driving voltages. Therefore, the level shifter 118 shifts the levels of the AC switching signals 106 and 117 and of the control signal 108 to high rate withstand voltage levels to supply these signals to the output circuit 131. The output circuit 131 inverts or non-inverts the gray scale voltages 130 on the basis of the inversion reference voltage 105 correspondingly to the AC switching signals 120 and 121 to buffer-output inverted/non-inverted voltages as liquid crystal driving voltages 132. The scanning circuit 133 generates a gate selection signal 134 for selecting horizontal lines one by one on the liquid crystal panel 135. Thus, the liquid crystal panel 135 is driven by a liquid crystal driving voltage 132 supplied in synchronism with the gate selection signal 134 so that display can be performed by liquid crystal driving voltages corresponding to display data, which are among the 64 levels of gray scale voltages of positive polarity or negative polarity.

Figure 9:
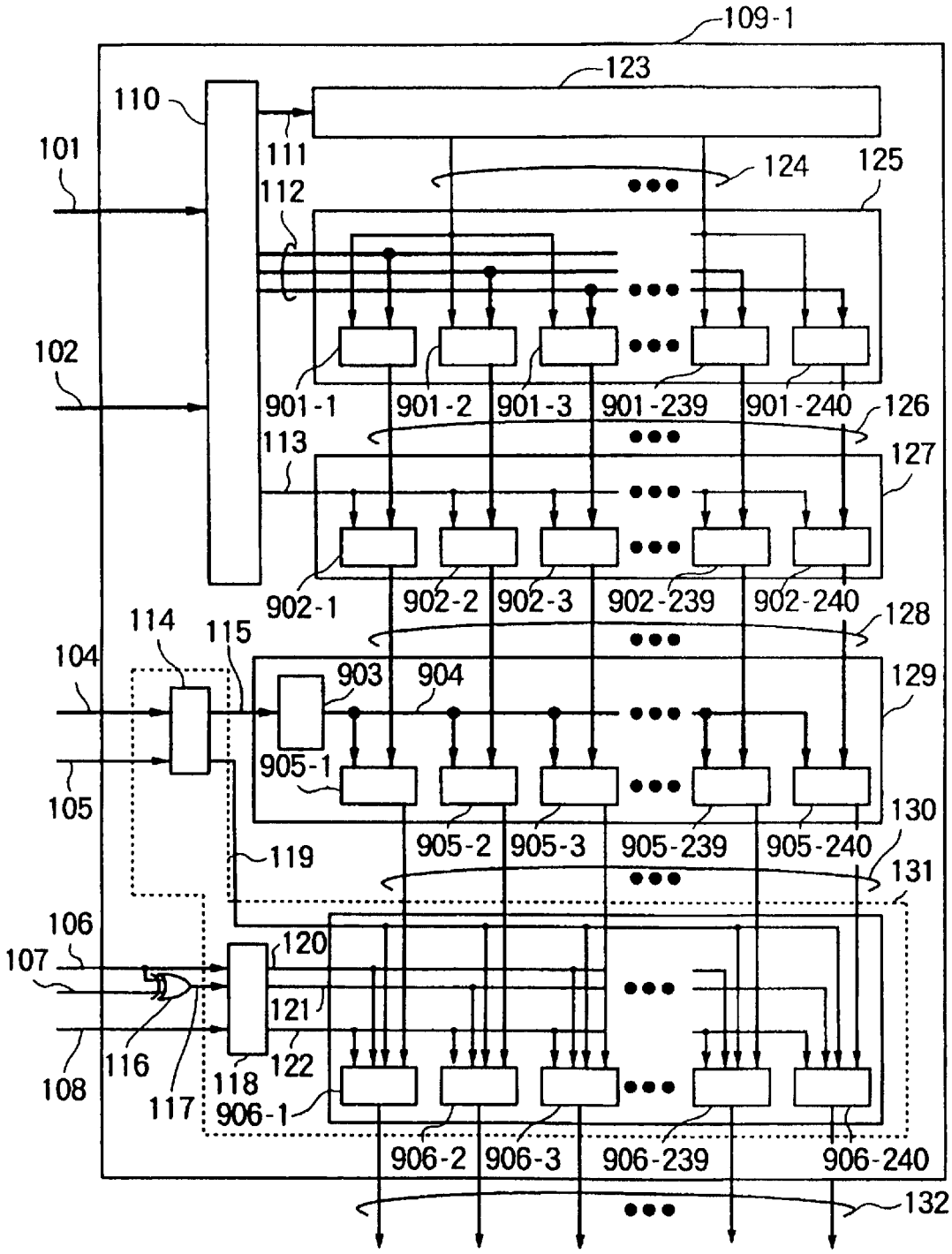
FIG. 9 is a block diagram of a liquid crystal driving circuit in the first embodiment.

FIG. 9 is a block diagram showing one of the data drivers depicted in FIG. 1. In FIG. 9, the reference numerals 901-1 to 901-240 designate 6-bit latch circuits respectively for latching display data on the basis of the latch signal 124; 902-1 to 902-240, 6-bit latch circuits respectively for latching the display data simultaneously on the basis of the display timing signal 113; 903, a gray scale voltage generating circuit for generating 64 levels of gray scale voltages from 9 levels of reference voltages 115; 904, 64-level gray scale voltages generated by the gray scale voltage generating circuit 903; 905-1 to 905-240, selection circuits each of which selects one voltage level from the 64 gray scale voltage levels 904 correspondingly to the display data 128 for each output; 906-1 to 906-240, output circuits each of which outputs a voltage obtained by inverting or non-inverting the gray scale voltage 130 on the basis of the inversion reference voltage 119 correspondingly to the AC switching signal 120 or 121 for each output; and 132, the liquid crystal driving voltage.

Display data 101 are latched successively by three pixels by the latch circuit 125 on the basis of the latch signal 124 generated by the latch address control circuit 123. Specifically, the display data 112 are latched by three pixels (18 bits) successively by the latch circuit 125 so that display data 112 are latched by 6-bit latch circuits 901-1, 901-2 and 901-3 corresponding to the first group of three pixels, latched by 6-bit latch circuits 901-4, 901-5 and 901-6 corresponding to the second group of three pixels and finally latched by 6-bit latch circuits 901-238, 901-239 and 901-240 corresponding to the last group of three pixels.

Thus, the eight drivers latch the display data successively, so that latching of display data corresponding to one line is completed. The display data 126 thus latched by the latch circuit 125 correspondingly to one line are further latched by the latch circuit 127 simultaneously on the basis of the display timing signal 113. The reference voltages 104 are 9-level voltages, which are buffered by the buffer circuit 114 and outputted as reference voltages 115. Then, the gray scale voltage generating circuit 903 generates 64 levels of gray scale voltages from the 9 levels of reference voltages 115.

Figure 10:
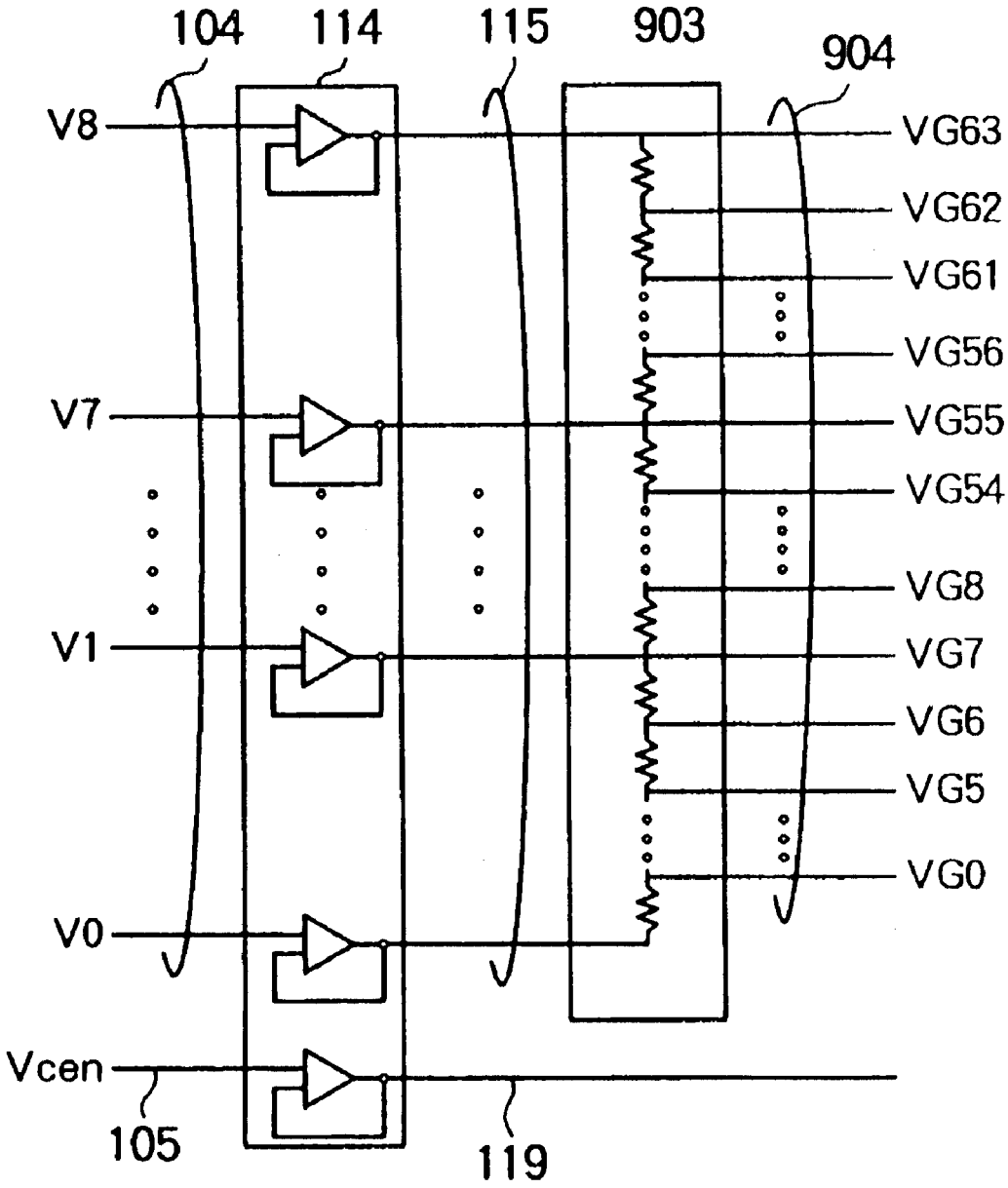
FIG. 10 is a configuration diagram of a gray scale voltage generating circuit in the first embodiment.

Referring now to FIG. 10, the gray scale voltage generating circuit 903 will be described in detail. The gray scale voltage generating circuit 903 generates 64 levels of gray scale voltages 904 (from VG63 to VG0) by dividing 8 difference voltages between the 9-level reference voltages 115 (from V8 to V0) buffered by the buffer circuit 114 into 8 parts, respectively, with use of a resistance element. On the other hand, the inversion reference voltage 105 is buffered by the buffer circuit 114 and outputted as an inversion reference voltage 119.

Referring back to FIG. 9, the gray scale voltages 904 are supplied to the gray scale voltage selection circuits 905-1 to 905-240 corresponding to the respective outputs. The gray scale voltage selection circuits 905-1 to 905-240 decode display data correspondingly to the display data 128 corresponding to the respective outputs, and each of the gray scale voltage selection circuits 905-1 to 905-240 selects one level from the 64 levels of gray scale voltages 904 to output the selected voltage as a gray scale voltage 130. That is, 64 levels of gray scale voltages 904 are in a voltage level range of from 0 V to 5 V are generated from the reference voltages 104 in a voltage level range of from 0 V to 5 V, so that gray scale voltages 130 corresponding to display data are selected from the 64 levels of gray scale voltages 904 correspondingly to the respective outputs.

Further, the AC switching signal 106 and the selection signal 107 are supplied to the EOR circuit 116, in which the AC switching signal 106 is outputted without inversion when the level of the selection signal 107 is "Low" whereas the AC switching signal 106 is outputted with inversion when the level of the selection signal 107 is "High". That is, the AC switching signal 117 is the same as the AC switching signal 106 when the level of the selection signal 107 is "Low" whereas the AC switching signal 117 is a signal obtained by inverting the AC switching signal 106 when the level of the selection signal 107 is "High". The control signal 108 is a signal for designating control of driving currents of the output circuits 906-1 to 906-240. The respective levels of the AC switching signals 106 and 117 and of the control signal 108 are shifted by the level shifter circuit 118 in order to adjust the voltage to the signal level of the output circuit 131 allowed to operate in a liquid crystal driving voltage level range (of from 5 V to −10 V), so that these signals are outputted as AC switching signals 120 and 121 and a control signal 122, respectively.

Figure 11:
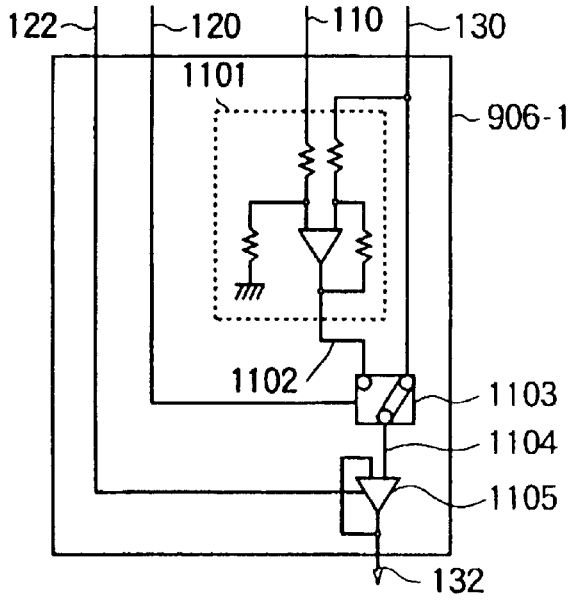
FIG. 11 is a configuration diagram of an output circuit in the first embodiment.

In the output circuit 131, each of the output circuits 906-1 to 906-240 corresponding to the respective outputs receives a positive-polarity gray scale voltage 130, an inversion reference voltage 119, AC switching signals 120 and 121 and a control signal 122 and inverts or non-inverts the gray scale voltage 130 on the basis of the inversion reference voltage 119 correspondingly to the AC switching signal to thereby drive the liquid crystal panel. Referring now to FIG. 11, the output circuit 906-1 will be described in detail. The output circuit 906-1 is composed of an inversion amplification circuit 1101, a selection circuit 1103 and an output buffer circuit 1105. A positive-polarity gray scale voltage 130 is inverted with respect to the inversion reference voltage 119 by the inversion amplification circuit 1101, so that the resulting voltage is outputted as an inversion voltage 1102. This inversion voltage 1102 is obtained by inverting the positive-polarity gray scale voltage 130.

Figure 13:
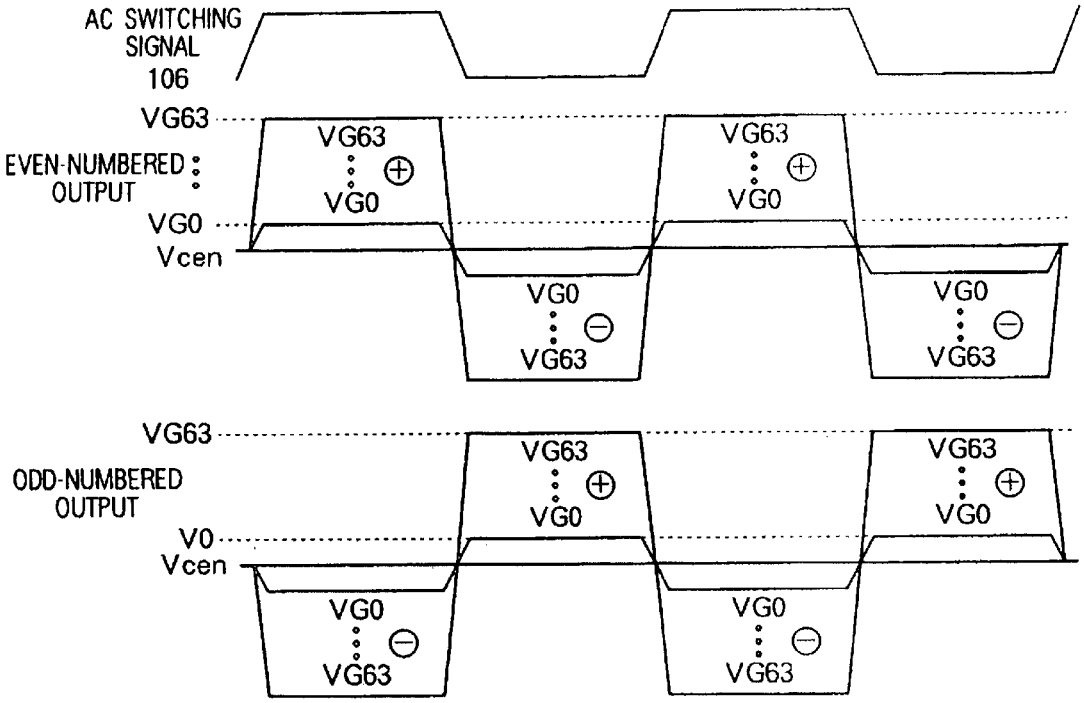
FIG. 13 is a timing chart of liquid crystal AC output voltages in the first embodiment.

Either gray scale voltage 130 or inversion voltage 1102 selected by the selection circuit 1103 correspondingly to the AC switching signal 120 is outputted as an output voltage 1104 and buffered by the output buffer circuit 1105 to drive the liquid crystal panel 135. Referring to FIG. 13, the timing of the AC output voltage will be described in detail. AC switching signals 120 and 121 correspond alternately to even-numbered and odd-numbered data driver outputs, respectively. Accordingly, in the case where the level of the selection signal 107 is turned to a "High" level, the AC switching signals 120 and 121 become signals inverted to each other so that the timing of AC switching of the even-numbered outputs is different from the timing of AC switching of the odd-numbered outputs. That is, in this case, the odd-numbered outputs have negative polarity when the even-numbered outputs have positive polarity whereas the odd-numbered outputs have positive polarity when the even-numbered outputs have negative polarity. Further, in the case where the level of the selection signal 107 is turned to a "Low" level, the AC switching signals 120 and 121 have equal polarity so that the timing of AC switching of the even-numbered outputs becomes equal to the timing of AC switching of the odd-numbered outputs. That is, in this case, the odd-numbered outputs have positive polarity when the even-numbered outputs have positive polarity whereas the odd-numbered outputs have positive negative when the even-numbered outputs have negative polarity. Further, in this case, the positive-polarity gray scale voltage and the negative-polarity gray scale voltage are reversed so as to be symmetric with respect to the inversion reference voltage 119 (Vcen).

Figure 12:
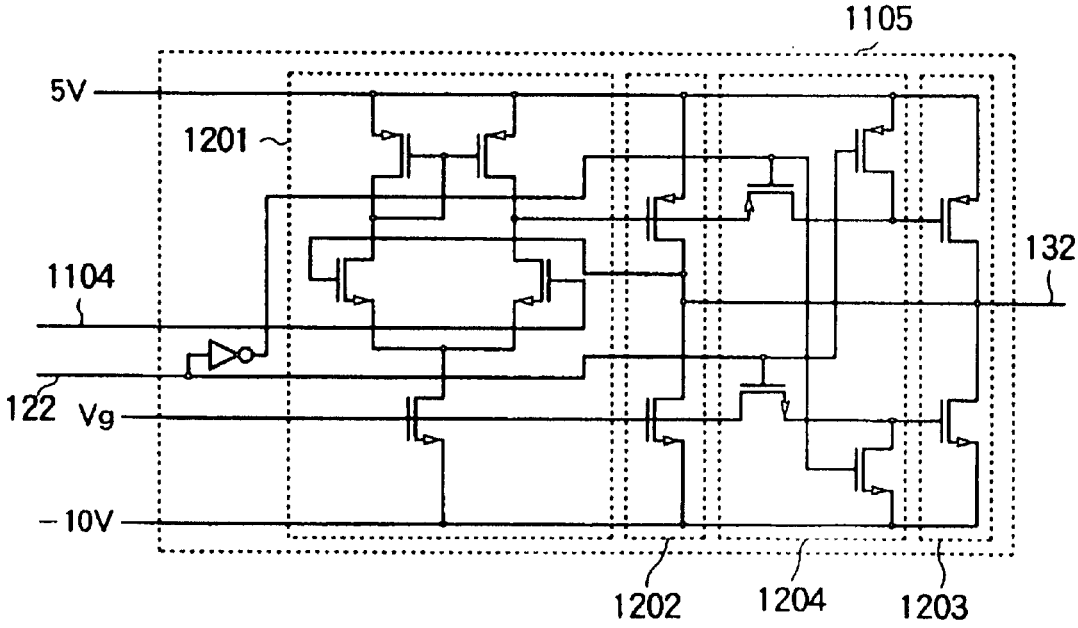
FIG. 12 is a configuration diagram of an output buffer circuit in the first embodiment.

FIG. 12 is a configuration diagram of the output buffer circuit depicted in FIG. 11. In FIG. 12, the reference numeral 1201 designates a differential amplification circuit; 1202 and 1203, current amplification circuits; and 1204, a selection circuit for making the current amplification circuit 1203 operative on the basis of the control signal 122.

The output buffer circuit 1105 is a voltage follower circuit which makes the differential amplification circuit 1201 receive the output voltage 1104 and makes the current amplification circuits 1202 and 1203 amplify the current to drive the liquid crystal panel 135. The control signal 122 is a signal for controlling the current amplification circuit 1203. The current amplification circuit 1203 is enabled to operate by turning the level of the control signal 122 to a "High" level so that the current amplification circuit 1203 can cooperate with the current amplification circuit 1202 to output a large current, whereas the current amplification circuit 1203 is disabled from operating by turning the level of the control signal 122 to a "Low" level so that the current amplification circuit 1202 alone can output a small current. In this manner, electric power consumed by the current amplification circuits can be saved because current amplification can be performed by using the two current amplification circuits 1202 and 1203 when a large output current is required and because the current amplification circuit 1203 can be disabled from operating so that the current amplification circuit 1202 alone is used for current amplification when such a large output current is not required.

Figure 14:
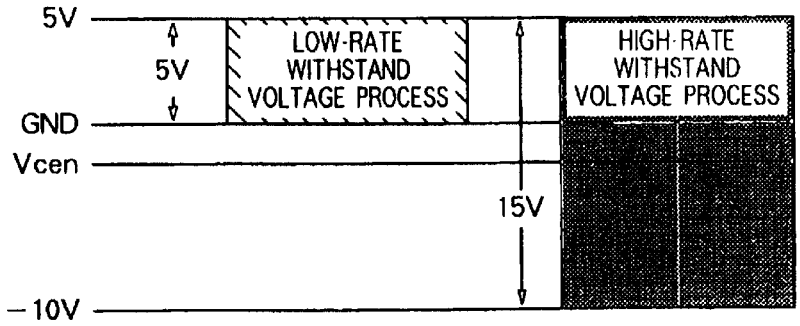
FIG. 14 is a view showing process voltages in the first embodiment.

Further, circuit portions surrounded by the broken line in the data driver in FIGS. 1 and 9 represent high rate withstand voltage processes (rate voltage: 15 V) and the others represent low rate withstand voltage processes (rate voltage: 5 V). As shown in FIG. 14, the chip area can be reduced by setting the level of the input signal in a range of from 5 V to GND, which allows the low rate withstand voltage process to operate and by setting the timing control circuit 110, the latch address control circuit 123, the latch circuits 125 and 127 and the gray scale voltage generating circuit 129 to be low ate withstand voltage processes small in gate length except setting the output circuit 131 to be a high rate withstand voltage process large in gate length. In the present state of things, the gate length of the low rate withstand voltage process (rate voltage: about 5 V to about 3 V) which is the latest fine process is from about 1.0 μm to about 0.6 μm and the gate length of the high rate withstand voltage process (rate voltage: about 30 V to about 10 V) is about 5 μm to about 2 μm.

Figure 15:
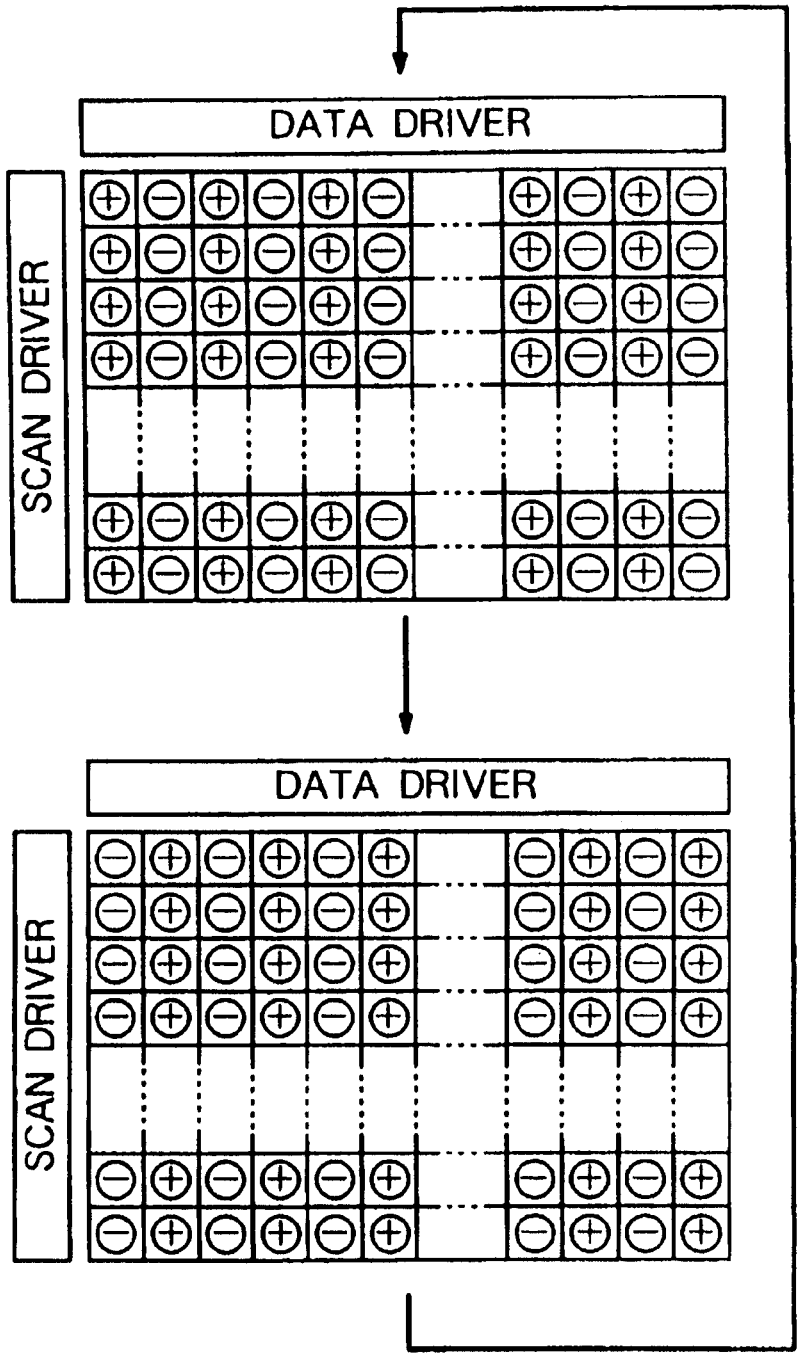
FIG. 15 is a view showing alternate-column inversion drive in the first embodiment.
Figure 16:
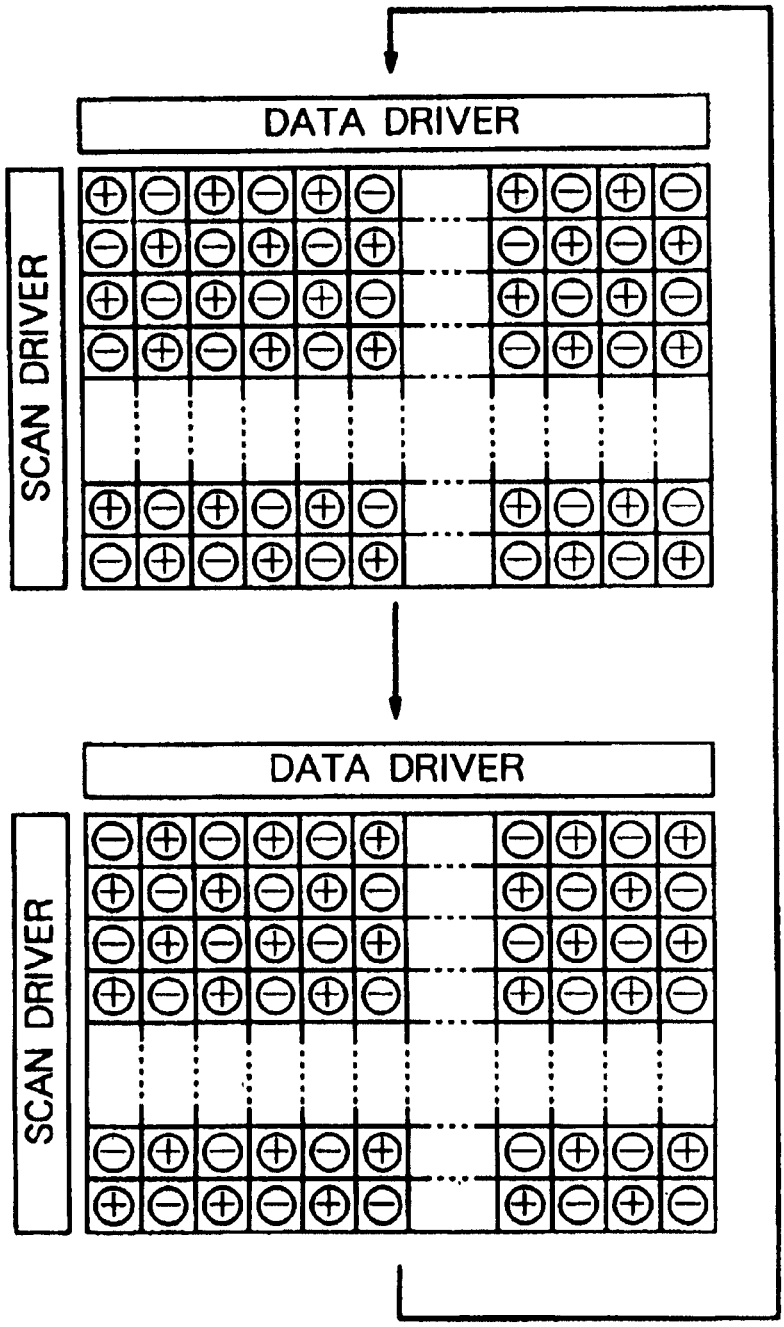
FIG. 16 is a view showing alternate-dot inversion drive in the first embodiment.

In the liquid crystal display using data drivers of this embodiment as described above, alternate-column inversion drive can be performed so that high quality image display can be made even in the case where the data drivers are arranged in one side of the liquid crystal panel as shown in FIG. 15. Further, alternate-column inversion drive can be performed by AC switching for each line as shown in FIG. 16, so that higher quality image display can be made. Further, this embodiment may be applied to common electrode AC drive as long as the setting of the selection signal 107 can be changed.

Although this embodiment has shown the case where 240-output data drivers are used as the data drivers, it is to be understood that the present invention may be applied also to the case where 192- or 160-output data drivers are used as the data drivers and that 192- or 160-output data drivers can be provided easily by rearranging the latch address control circuits and the latch circuits correspondingly to the number of outputs. Although the description of this embodiment has been made upon the case where the rate voltage of the low rate withstand voltage process and the rate voltage of the high rate withstand voltage process are 5 V and 15 V, respectively, the same effect as in this embodiment can be obtained in the case where the rate voltage of the low rate withstand voltage process and the rate voltage of the high rate withstand voltage process are, for example, in a range of from 5 V to 3 V and in a range of 30 V to 10 V, respectively.

The scanning driver in this embodiment will be described below.

Figure 17:
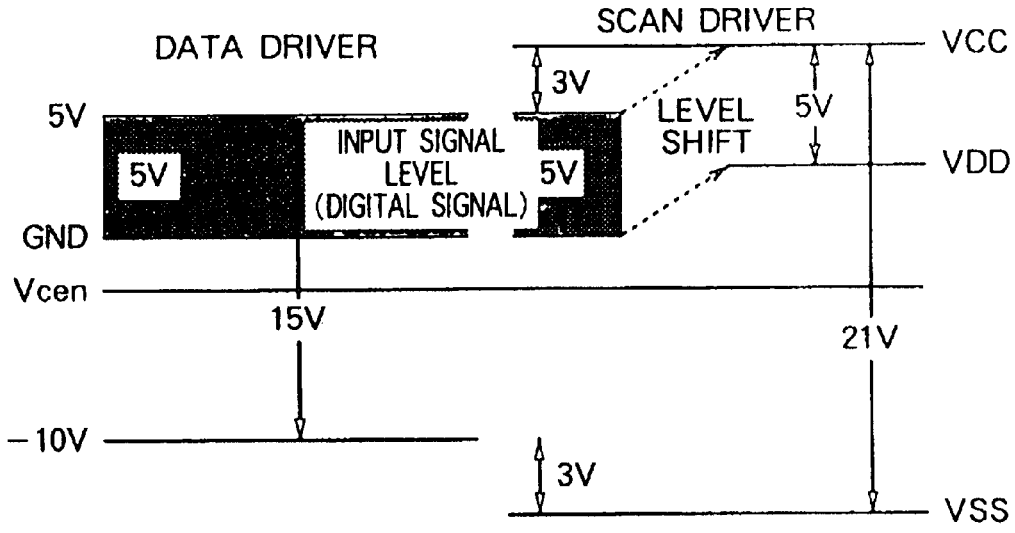
FIG. 17 is a view showing the levels of driver voltages in the first embodiment.

As shown in FIG. 17, the operating voltage level of the data driver and the operating voltage level of the scanning driver are different from each other. Because of the characteristic of TFT of the liquid crystal panel, it is necessary that the gate selection signal outputted from the scanning driver be a voltage signal having upper and lower limits which are larger by about 3 V than the respective upper and lower limits of the liquid crystal supply voltage outputted from the data driver. Because the digital signal operating level of the scanning driver is 5 V which is a potential difference between VCC and VDD, there arises a difference between the voltage level of the digital input signal of the data driver and the voltage level of the digital input signal of the scanning driver. In a conventional liquid crystal panel, the level of the digital input signal is set as the signal level of the data driver while the level of the input signal to the scanning driver which is small in the number of signal lines is shifted by an external circuit so as to be adjusted before the input signal is inputted to the scanning driver. This is a main cause of increase in size of peripheral circuits used for the liquid crystal display.

Figure 19:
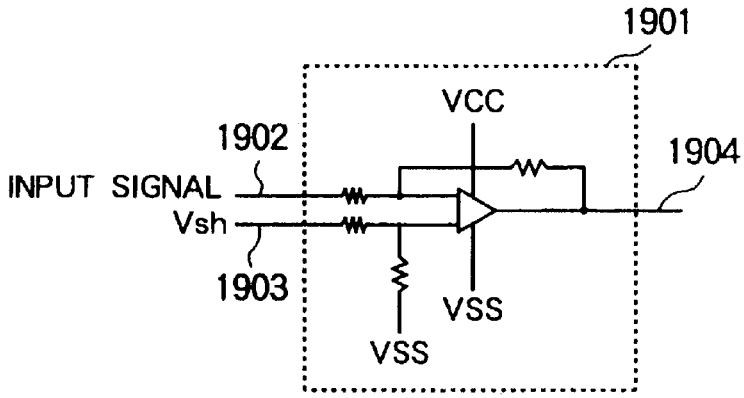
FIG. 19 is a configuration diagram of the level-shift circuit in the first embodiment.
Figure 20:
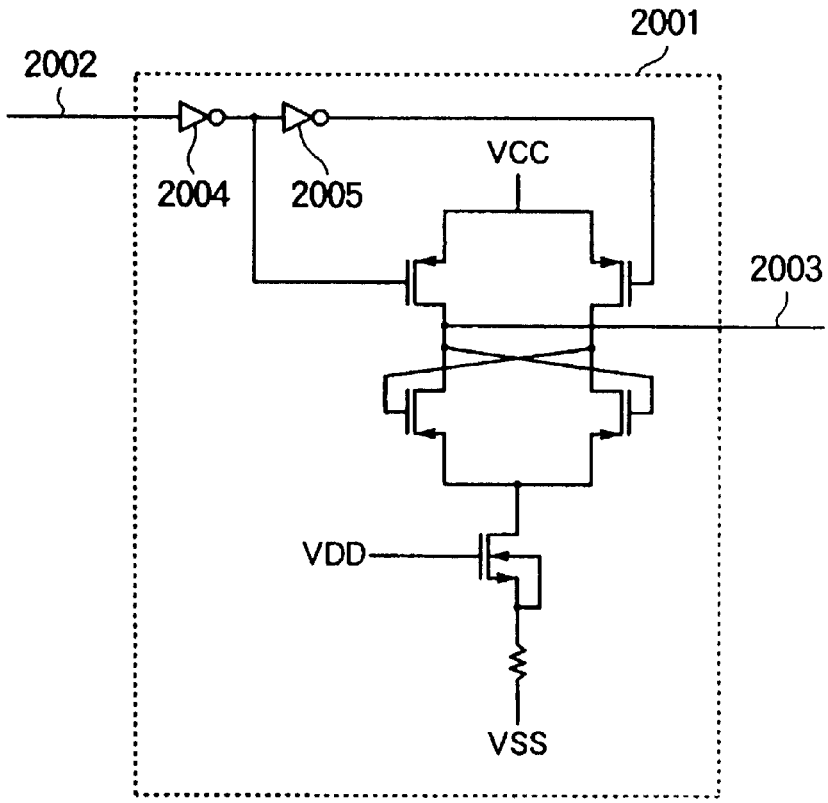
FIG. 20 is a configuration diagram of the level-shift circuit in the first embodiment.

In this embodiment, a level-shift circuit is provided in the input side of the scanning driver so that the circuit scale of the peripheral circuits can be reduced. FIG. 19 shows an example of configuration of the level-shift circuit. In FIG. 19, the reference numeral 1901 designates a one-signal level-shift circuit using an inversion amplification circuit; 1902, an input signal; 1903, an inversion reference voltage for inversion and amplification; and 1904, a signal obtained by inverting the input signal 1902 and then shifting the level thereof. This level-shift circuit 1901 can be adapted to various input voltage levels as long as the inversion reference signal 1903 is set correspondingly to the voltage level of the input signal. Further, FIG. 20 shows another example of configuration of the level-shift circuit. In FIG. 20, the reference numeral 2001 designates a level-shift circuit; 2002, an input signal; 2003, a signal obtained by non-inverting the input signal 2002 and then shifting the level thereof; and 2004 and 2005, inverter circuits.

The threshold voltage of the inverter circuit 2004 is set to the center of the input signal level, and the amplitude level thereof is VCC-VSS. The amplitude level of the inverter circuit 2005 is VCC-VSS. In this level-shift circuit 2001, inversion/non-inversion level-shifted signals can be outputted without necessity of the reference voltage as shown in the level-shift circuit 1901.

Figure 18:
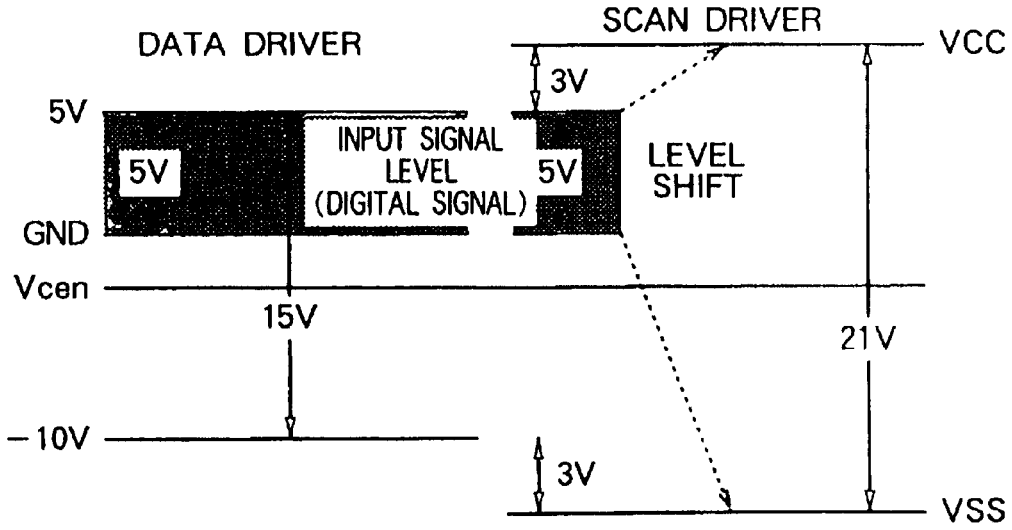
FIG. 18 is a view showing the levels of driver voltages in the first embodiment.

Further, as shown in FIG. 18, the level of the input signal may be shifted to the level of VCC-VSS so that circuit operation is performed at the amplitude level of VCC-VSS. Also in this case, the reduction of the circuit scale of peripheral circuits can be attained. This can be realized when an inverter circuit having a threshold voltage set to the center of the input signal level is provided in the input side of the scanning driver.

As described above, in this embodiment, because a buffer circuit for buffering 9-level liquid crystal reference voltages 104 is arranged in the input side of each data driver, the driving current is small so that the circuit scale of the electric source circuit 103 can be reduced.

A second embodiment of the present invention in which data drivers for performing 64-level gray scale display on the basis of 9-level reference voltages are used will be described below. The gray scale voltage generating circuit in this embodiment is different from that in the first embodiment, but the other circuits in this embodiment are similar to those in the first embodiment.

Figure 21:
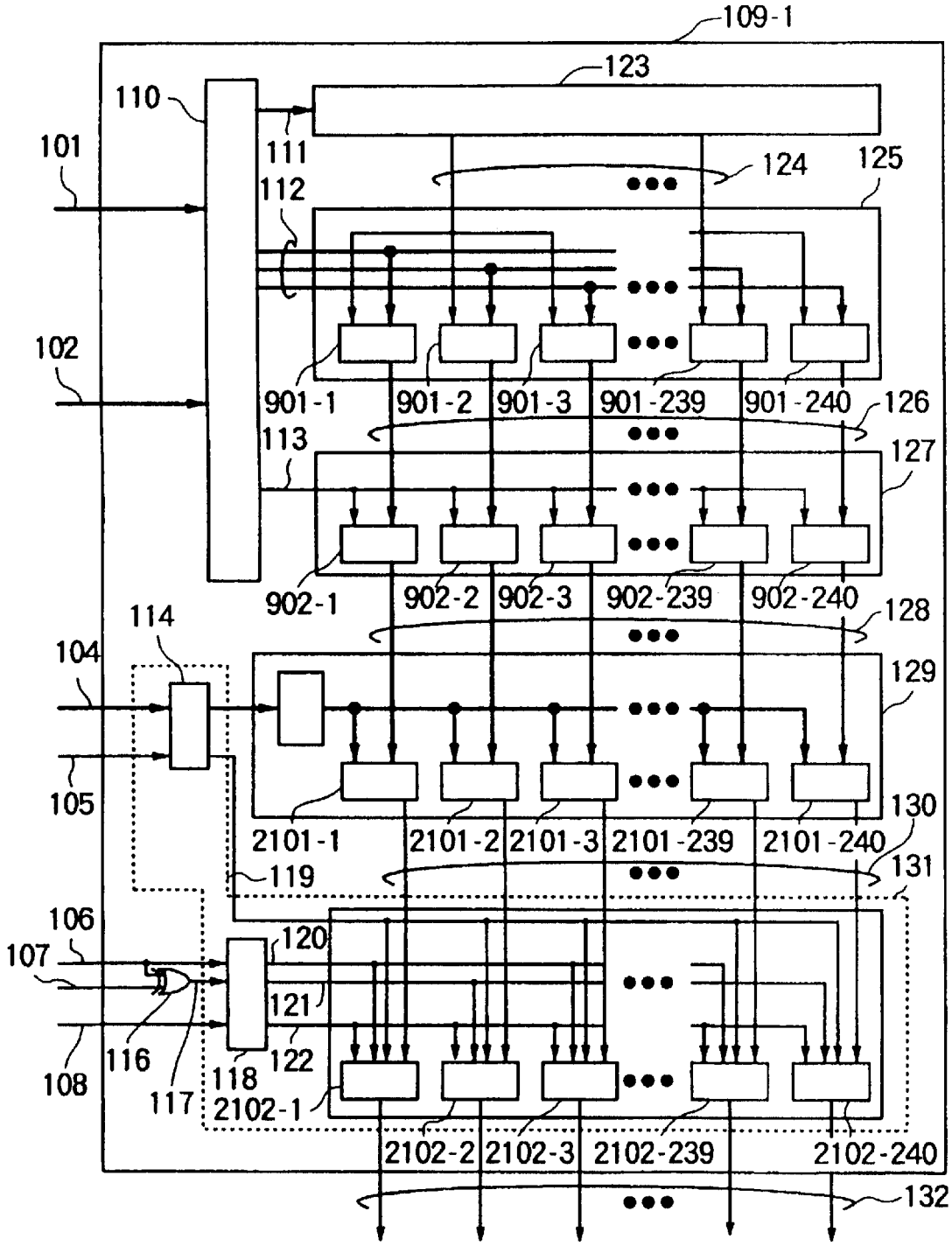
FIG. 21 is a block diagram of a liquid crystal driver according to a second embodiment of the present invention.

FIG. 21 is a detailed block diagram of the data driver 109-1 depicted in FIG. 1.

In FIG. 21, the reference numerals 2101-1 to 2101-240 designate selection circuits each of which selects one level from the reference voltages 115 correspondingly to display data 128 for each output; 2102-1 to 2102-240, output circuits each of which outputs a voltage obtained by inverting or non-inverting the gray scale voltage 130 on the basis of the inversion reference voltage 119 correspondingly to the AC switching signal 120 or 121 for each output; and 132, liquid crystal driving voltages.

The display data 101 are latched by three pixels successively by the latch circuit 125 on the basis of the latch signal 124 generated by the latch address control circuit 123. Specifically, the display data 101 are latched by three pixels (18 bits) by the latch circuit 125 successively in a manner so that display data 112 are latched by 6-bit latch circuits 901-1, 901-2 and 901-3 corresponding to the first group of three pixels, next latched by 6-bit latch circuits 901-4, 901-5 and 901-6 corresponding to the second group of three pixels and finally latched by 6-bit latch circuits 901-238, 901-239 and 901-240 corresponding to the last group of three pixels.

Thus, the eight data drivers latch the display data successively, so that latching of display data corresponding one line is completed. The display data 126 thus successively latched by the latch circuit 125 correspondingly to one line are latched simultaneously by the latch circuit 127 on the basis of the display timing signal 113. The reference voltages 104 which are 9-level reference voltages are buffered by the buffer circuit 114 and then outputted as reference voltages 115. On the other hand, the inversion reference voltage 105 is buffered by the buffer circuit 114 and then outputted as an inversion reference voltage 119.

The reference voltages 115 are supplied to the gray scale voltage generating circuit 2101-1 to 2102-240 corresponding to respective outputs. The gray scale voltage generating circuits 2101-1 to 2101-240 generate gray scale voltages 130 corresponding to display data from the display data 128 and the reference voltages 115 corresponding to the respective outputs.

Figure 22:
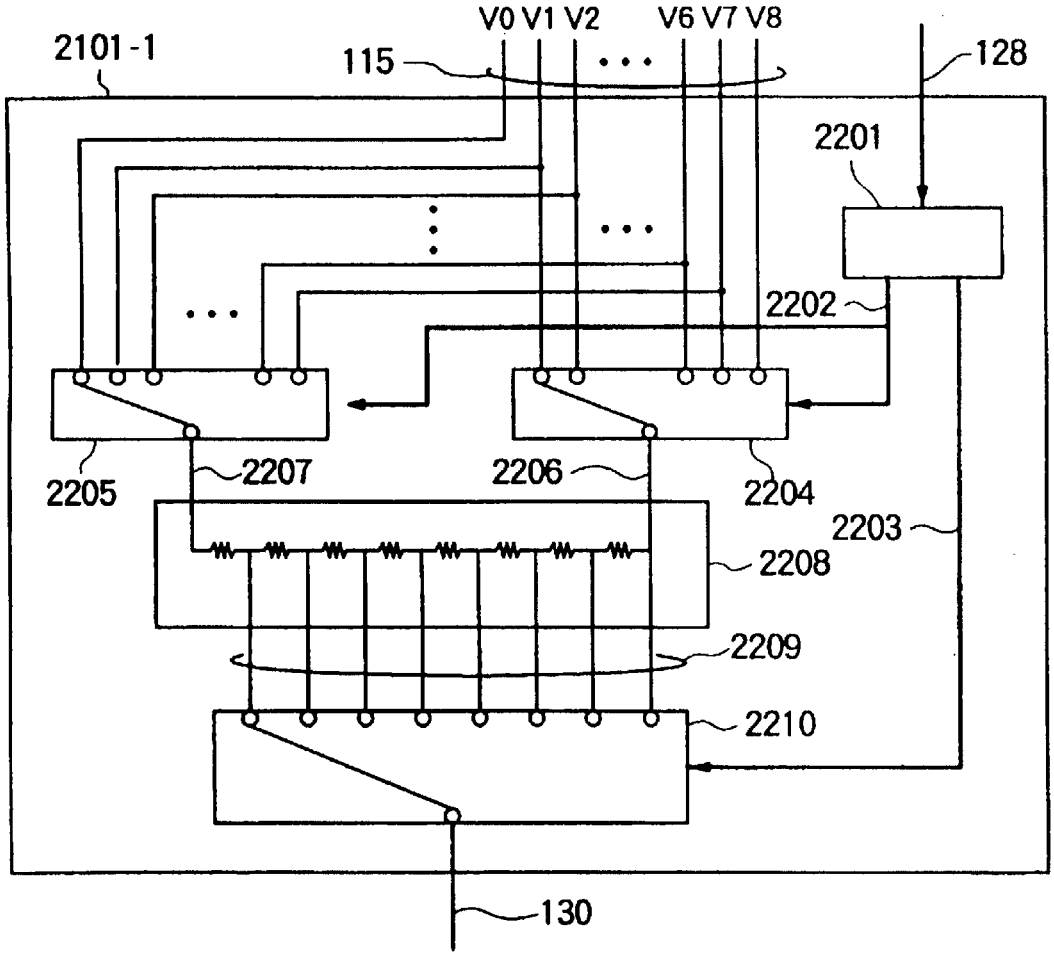
FIG. 22 is a block diagram of the gray scale voltage generating circuit in the second embodiment.

FIG. 22 is a block diagram of one of gray scale voltage generating circuits in a data driver. In FIG. 22, the reference numeral 2201 designates a decoder for decoding the display data 128; 2202, a decoded signal constituted by upper three bits of the display data decoded by the decoder 2201; 2203, a decoded signal constituted by lower three bits of the display data decoded by the decoder 2201; 2204, a selection circuit for selecting one level from 8 levels of from V8 to V1 among the 9-level reference voltages 115 on the basis of the decoded signal 2202; 2205, a selection circuit for electing one level from 8 levels of from V7 to V0 among the 9-level reference voltages 115 on the basis of the decoded signal 2202; 2206 and 2207, voltages selected by the selection circuits 2204 and 2205, respectively; 2208, a voltage dividing circuit for dividing the potential difference between the selected voltages 2206 and 2207 into eight by eight resistance elements; 2209, 8 levels of gray scale voltages obtained by the voltage dividing circuit 2208; and 2210, a selection circuit for selecting one level from the 8 levels of gray scale voltages 2209 on the basis of the decoded signal 2203.

The 6-bit display data 128 which express 64 gray scales are decoded by the decoder 2201 so that the upper three bits of the display data 128 and the lower three bits thereof are independent from each other. The decoded signal 2202 of the upper three bits on 8 lines is supplied to the selection circuits 2204 and 2205, and the decoded signal of the lower three bits on 8 lines is supplied to the selection circuit 2210. The selection circuit 2204 selects one level from 8 levels of from V8 to V1 among the 9level reference voltages 115 (V8 to V0) correspondingly to the decoded signal 2202. The selection circuit 2205 selects one level from 8 levels of from V7 to V0 among the 9level reference voltages 115 (V8 to V0) correspondingly to the decoded signal 2202. Assume now that combinations of the two voltages which are selected by the selection circuits 2204 and 2205, respectively, are V8-V7, V7-V6, V6-V5, V5-V4, V4-V3, V-3-V2, V2-V1, and V1-V0.

The voltage dividing circuit 2208 divides the potential difference between the two selected voltages 2206 and 2207 into eight to generate 8 levels of gray scale voltages in between the two selected voltages. The selection circuit 2210 selects one level from the 8 levels of gray scale voltages 2209 generated by the voltage dividing circuit correspondingly to the decoded signal 2203 to output the selected level as a gray scale voltage 130. In this manner, 64 levels of gray scale voltages can be generated by using eight combinations of the selected voltages 2206 and 2207 and division of potential difference in each combination into eight. That is, 64 levels of gray scale voltages in a range of from 0 V to 5 V are generated from the reference voltages 104 having voltage levels of from 0 V to 5 V, so that a gray scale voltage 130 corresponding to the display data is selected from the 64 levels of gray scale voltages correspondingly to each output.

Figure 23:
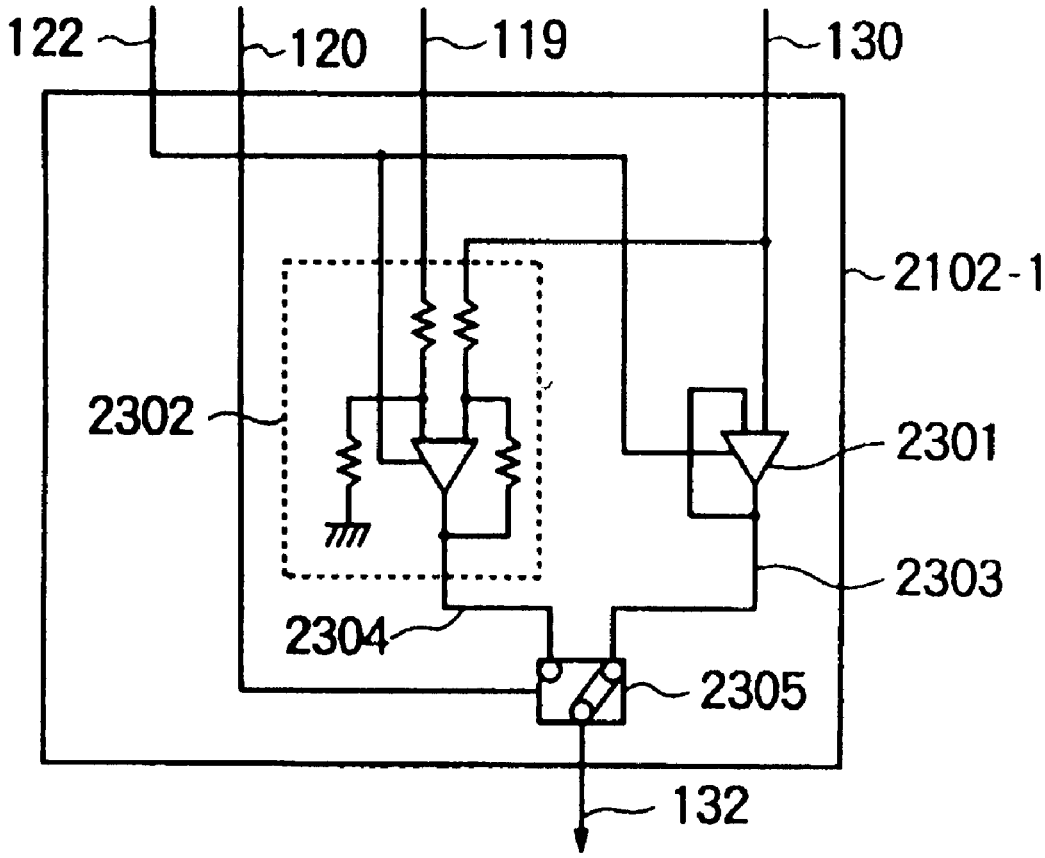
FIG. 23 is a block diagram of the output circuit in the second embodiment.

FIG. 23 is a block diagram of one of the output circuits 131 in a data driver. Each of output circuits 2102-1 to 2102-240 corresponding to respective outputs receives a positive-polarity gray scale voltage 130, an inversion reference voltage 119, AC switching signals 120 and 121 and a control signal 122. The gray scale voltage 130 is inverted or non-inverted on the basis of the inversion reference voltage 119 correspondingly to the AC switching signal 120 to thereby drive the liquid crystal panel. The output circuit 2102-1 is composed of a non-inversion amplification circuit 2301, an inversion amplification circuit 2302, and a selection circuit 2305. The positive-polarity gray scale voltage 130 is amplified by the non-inversion amplification circuit 2301 and outputted as a positive voltage 2303. On the other hand, the positive-polarity gray scale voltage 130 is inverted on the basis of the inversion reference voltage 119 by the inversion amplification circuit 2302 and outputted as an inversion voltage 2304.

This inversion voltage 2304 which is a voltage obtained by inverting the positive-polarity gray scale voltage 130 corresponds to a negative-polarity liquid crystal driving voltage. Either positive voltage 2303 or inversion voltage 2304 is selected by the selection circuit 2305 correspondingly to the AC switching signal 120 and outputted as an output voltage 132 to drive the liquid crystal panel 135.

A third embodiment of the present invention will be described below. This embodiment is different from the first embodiment in the circuit for inverting the reference voltage.

Figure 24:
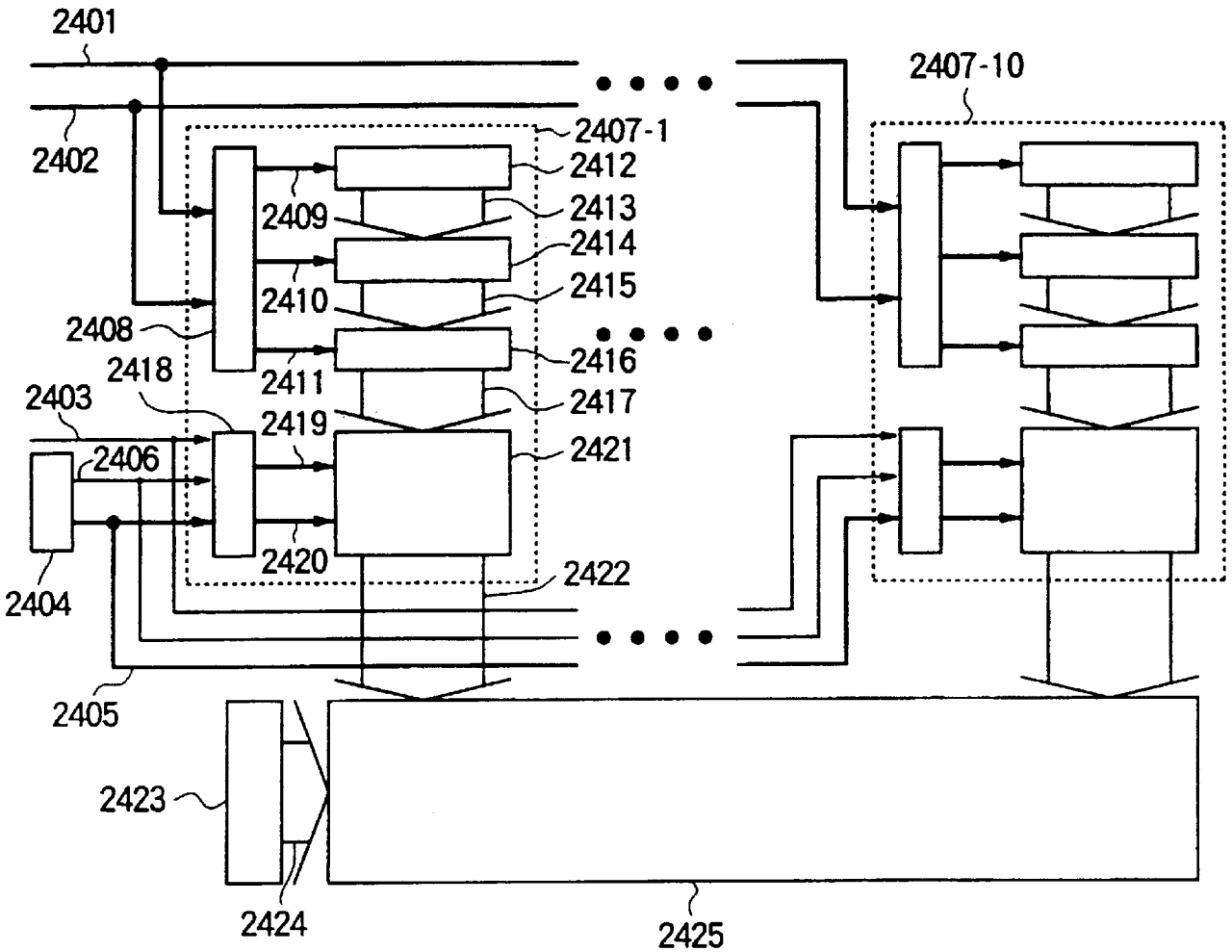
FIG. 24 is a block diagram of a liquid crystal display device according to a third embodiment of the present invention.

FIG. 24 is a configuration diagram of the liquid crystal display device in the third embodiment. In FIG. 24, the reference numeral 2401 designates display data transferred from a system; 2402, a group of control signals; 2403, an AC switching signal expressing the timing of AC switching; 2404, an power supply circuit or generating reference voltages which are used for generating liquid crystal driving voltages; and 2405 and 2406, DC reference voltages generated by the electric source circuit 2404. The reference numerals 2407-1 to 2407-10 designate data drivers each having 192 outputs. In each of the data drivers, the reference numeral 2408 designates a timing control circuit; 2409, a group of timing signals; 2410, display data; 2411, a timing signal expressing display timing; 2412, a latch address control circuit; 2413, a group of latch signals generated by the latch address control circuit 2412; 2414, a latch circuit for latching the display data 2410 successively; 2415, display data latched by the latch circuit 2414; 2416, a latch circuit for latching the display data 2415 simultaneously on the basis of the timing signal 2411; and 2417, display data latched by the latch circuit 2416. The reference numeral 2418 designates a voltage generating circuit for generating AC reference voltages used for AC driving the liquid crystal on the basis of the reference voltages 2405 and 2406; and 2419 and 2420, AC reference voltages generated by the voltage generating circuit. The reference numeral 2421 designates a liquid crystal driving circuit for generating liquid crystal driving voltages corresponding to the display data 2417 on the basis of the AC reference voltages 2419 and 2420; and 2422, liquid crystal driving voltages generated by the liquid crystal driving circuit 2421. The reference numeral 2423 designates a scanning circuit; 2424, gate driving signals successively selected by the scanning circuit 2423; and 2425, a liquid crystal panel.

The data drivers are required because the number of outputs from each of the data drivers 2407-1 to 2407-10 is 192 and because the resolution of the liquid crystal panel 2425 is 640×RGB×480 pixels. The display data 2401 which are 18-bit display data (3 pixels×6 bits for gray scales) are transferred successively, so that latch signals 2413 synchronized with the display data 2401 are generated by the latch address control circuits 2412 on the basis of the control signal group 2409 to thereby latch the display data 2410 in the latch circuits 2414 successively. Each of the latch circuits 2414 has latch circuits for latching 192 pixels (6 bits per one pixel) so that display data corresponding to one horizontal line can be latched successively in the data drivers 2407-1 to 2407-10. The display data 2415 thus latched by the latch circuits 2414 correspondingly to one horizontal line are further latched simultaneously by the latch circuits 2416 on the basis of the display timing signal 2411 synchronized with the gate selection signal 2424 outputted from the scanning circuit 2423. The display data 2417 thus latched are supplied to the liquid crystal driving circuit 2421. The voltage generating circuit 2418 generates AC reference voltages 2419 and 2420 different in AC switching timing from each other on the basis of the reference voltages 2405 and 2406 generated by the power supply circuit 2404 and the AC switching signal 2403 so as to be supplied to the liquid crystal driving circuit 2421. In the liquid crystal driving circuit 2421, liquid crystal driving voltages 2422 corresponding to the display data 2417 are generated on the basis of the AC reference voltages 2419 and 2420 to thereby drive the liquid crystal panel 2425.

Figure 25:
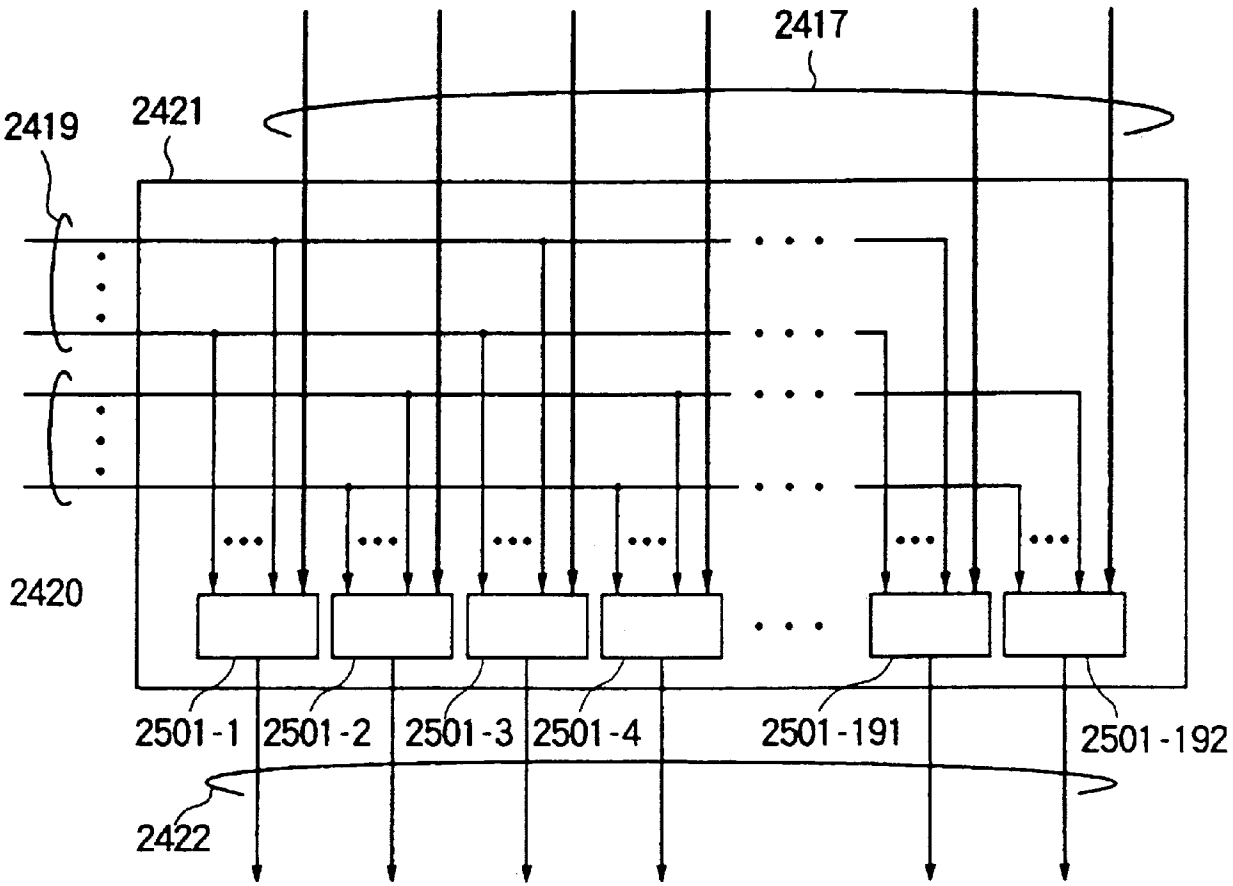
FIG. 25 is a block diagram of the liquid crystal driver circuit in the third embodiment.

In FIG. 25, the reference numerals 2501-1 to 2501-192 designate liquid crystal driving circuits corresponding to respective outputs.

The AC reference voltages 2419 and 2420 are supplied to the liquid crystal driving circuits 2501-1 to 2501-192 alternately for the 192 outputs. Each of the liquid crystal driving circuits 2501-1 to 2501-192 generates and outputs 64 levels of liquid crystal driving voltages on the basis of the display data of 6 bits per one output and 9 levels of AC reference voltages 2419 or 2420. The 64 levels of liquid crystal driving voltages can be outputted by selecting 2 levels from the 9 levels of AC reference voltages with use of upper 3 bits of the 6-bit display data and then selecting one level from 8 levels of voltages obtained by dividing the selected two levels of voltages into 8 equal parts with use of lower 3 bits of the display data. In this manner, the data driver can generate a liquid crystal driving voltage in which AC switching timing varies correspondingly to each output, so that alternate-column inversion drive of the liquid crystal panel 2425 can be performed.

Although this embodiment has shown the case where each of the liquid crystal driving circuits has a structure in which AC reference voltages different in AC switching timing are switched over once per one output, the present invention can be applied to the case where AC reference voltages are switched over once per two outputs or once per a plurality of outputs.

Figure 26:
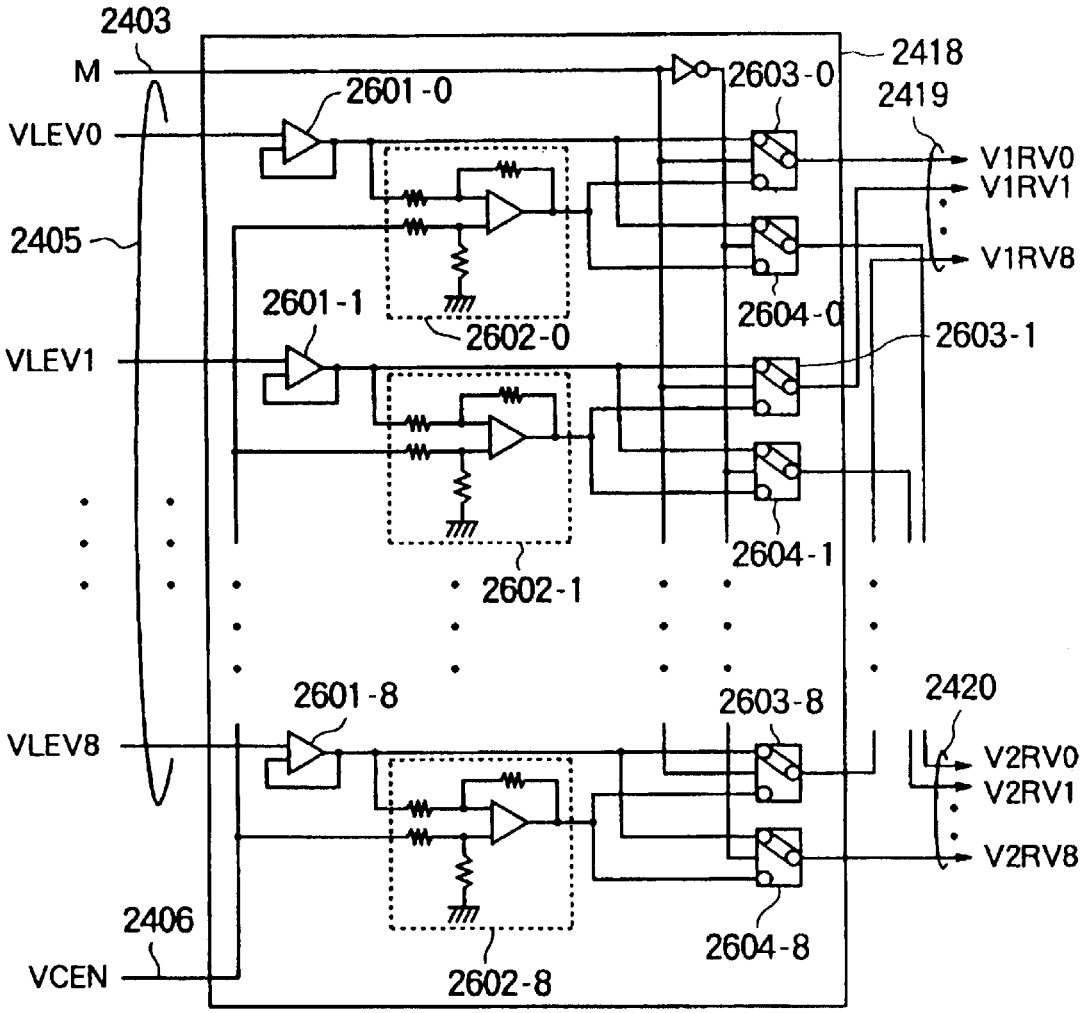
FIG. 26 is a configuration of the voltage generating circuit in the third embodiment.

FIG. 26 is a configuration diagram of one of the voltage generating circuits depicted in FIG. 24. In FIG. 26, the reference numerals 2601-0 to 2601-8 designate amplification buffer circuits; 2602-0 to 2602-8, designate amplification circuits; and 2603-0 to 2603-8 and 2604-0 to 2604-8, selection circuits.

Reference voltages 2405 of 9 levels VLEV0 to VLEV9 from the electric source circuit 2404 are buffered by the amplification buffer circuits 2601-0 to 2601-8 and supplied to the differential amplification circuits 2602-0 to 2602-8 and the selection circuits 2603-0 to 2603-8 and 2604-0 to 2604-8, respectively. In the differential amplification circuits 2602-0 to 2602-8, the reference voltages (VLEV0 to VLEV8) 2405 are inverted and outputted on the basis of the reference voltage (VCEN) 2406. The selection circuits 2603-0 to 2603-8 and 2604-0 to 2604-8 receive the outputs of the amplification buffer circuits 2601-0 to 2601-8 and the outputs of the differential amplification circuits 2602-0 to 2602-8, respectively, and select these outputs on the basis of the AC switching signal 2403. Because inverted AC switching signals are inputted to the selection circuits 2604-0 to 2604-8, the polarity of voltages selected by the selection circuits 2603-0 to 2603-8 and the polarity of voltages selected by the selection circuits 2604-0 to 2604-8 are reversed to each other.

Figure 27:
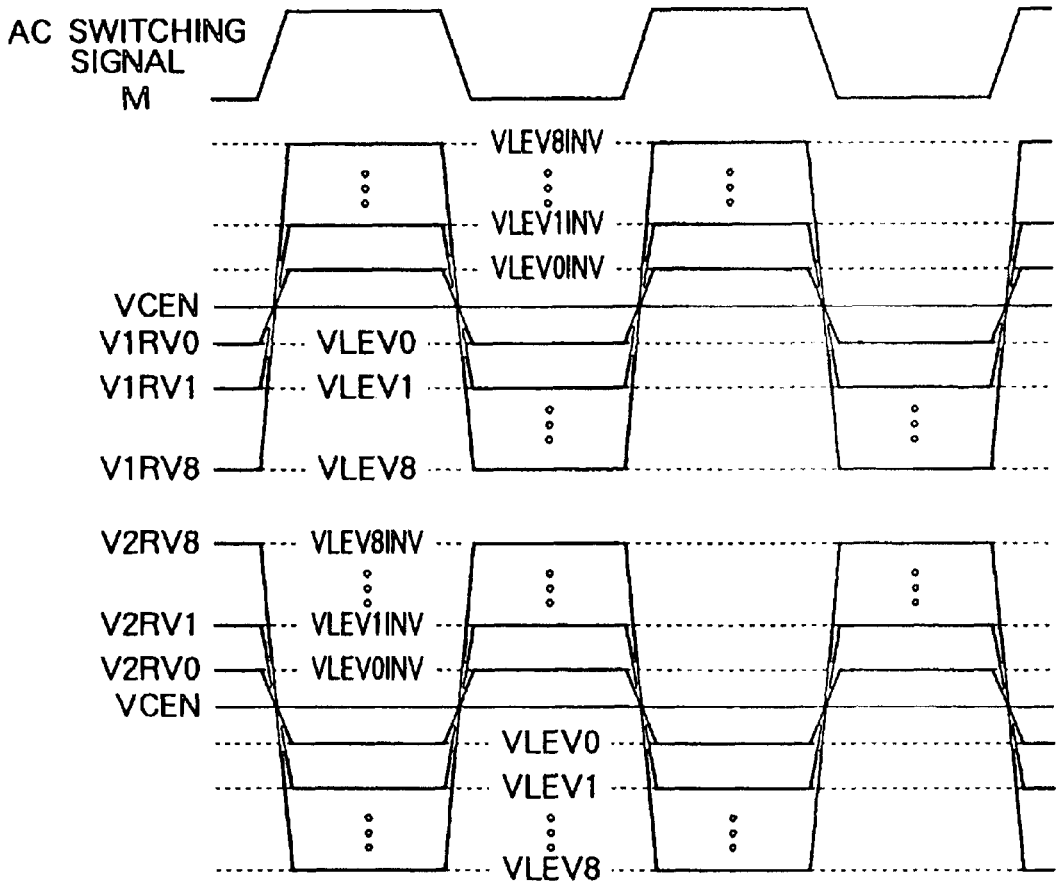
FIG. 27 is a timing chart showing the generation of liquid crystal reference voltages in the third embodiment.

This timing is shown in FIG. 27. When the level of the AC switching signal (M) 2403 is high, AC reference voltages (V1RV0 to V1RV8) 2419 selected by the selection circuits 2603-0 to 2603-8 are outputted as values VLEV0INV–VLEV8INV, respectively, and AC reference voltages (V2RV0 to V2RV8) 2420 selected by the selection circuits 2604-0 to 2604-8 are outputted as values VLEV0–VLEV8, respectively. When the level of the AC switching signal (M) 2403 is contrariwise low, AC reference voltages (V1RV0 to V1RV8) 2419 selected by the selection circuits 2603-0 to 2603-8 are outputted as values VLEV0–VLEV8, respectively, and AC reference voltages (V2RV0 to V2RV8) 2420 selected by the selection circuits 2604-0 to 2604-8 are outputted as values VLEV0INV–VLEV8INV, respectively. In this manner, AC reference voltages 2419 and 2420 different in AC switching timing from each other are generated.

Figure 28:
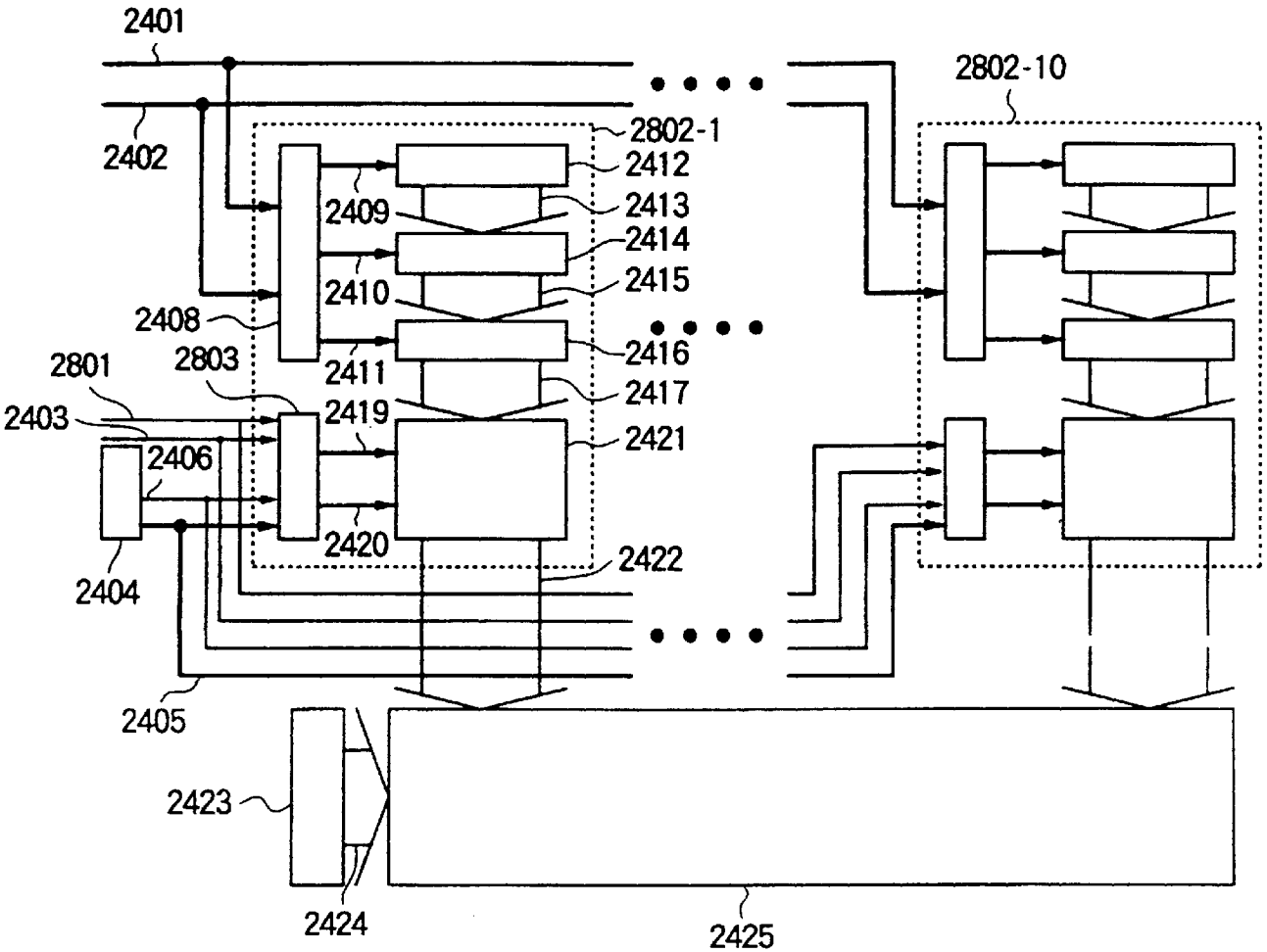
FIG. 28 is a configuration diagram of a liquid crystal display device according to a fourth embodiment of the present invention.

A fourth embodiment of the present invention will be described below. This embodiment is similar to the third embodiment except that voltage generating circuits used in this embodiment are assembled so as to be different from those in the third embodiment so that this embodiment can be adapted to common electrode AC drive of the liquid crystal panel. FIG. 28 is a block diagram showing the liquid crystal display device according to the present invention.

In FIG. 28, the reference numeral 2801 designates control circuits for controlling the timing of AC reference voltages; 2802, data drivers; and 2803, voltage generating circuits for generating AC reference voltages which are used for AC driving the liquid crystal on the basis of the reference voltages 2405 and 2406.

Ten data drivers are required because the number of outputs from each of the data drivers 2802-1 to 2802-10 is 192 and because the resolution of the liquid crystal panel 2425 is 640×RGB×480 pixels. The display data 2401 which are 18-bit display data (3 pixels×6 bits for gray scales) are transferred successively, so that latch signals 2413 synchronized with the display data 2401 are generated by the latch address control circuits 2412 on the basis of the control signal group 2409 to thereby latch the display data 2410 in the latch circuits 2414 successively. Each of the latch circuits 2414 has latch circuits for latching 192 pixels (6 bits per one pixel) so that display data corresponding to one horizontal line can be latched successively in the data drivers 2802-1 to 2802-10. The display data 2415 thus latched by the latch circuits 2414 correspondingly to one horizontal line are further latched simultaneously by the latch circuits 2416 on the basis of the timing signal 2411 synchronized with the gate selection signal 2424 outputted from the scanning circuit 2423. The display data 2417 thus latched are supplied to the liquid crystal driving circuits 2421. The voltage generating circuits 2803 generate AC reference voltages 2419 and 2420 on the basis of the reference voltages 2405 and 2406 generated by the electric source circuit 2404, the AC switching signal 2403 and the control signal 2801 so as to be supplied to the liquid crystal driving circuits 2421. In the liquid crystal driving circuits 2421, liquid crystal driving voltages 2422 corresponding to the display data 2417 are generated on the basis of the AC reference voltages 2419 and 2420 to thereby drive the liquid crystal panel 2425.

Figure 29:
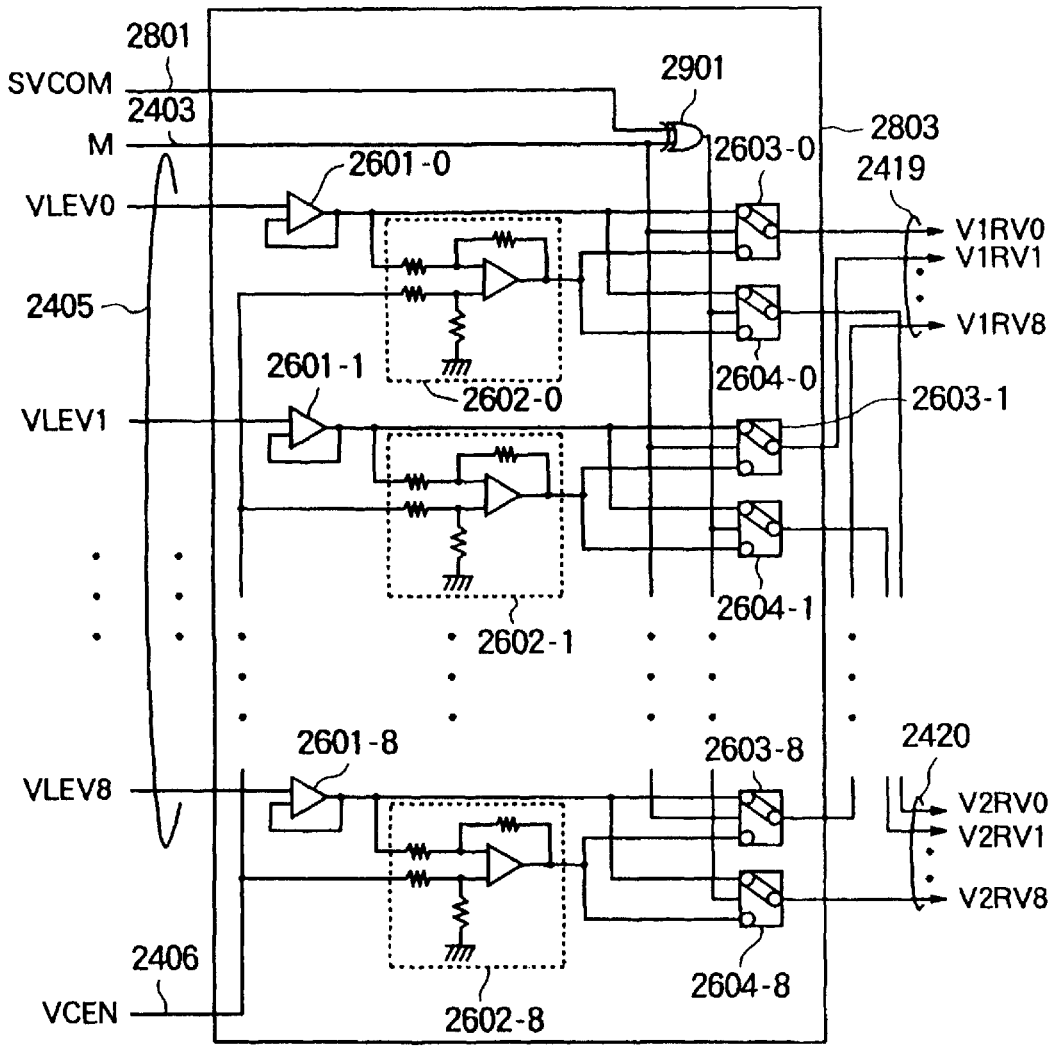
FIG. 29 is a configuration diagram of the voltage generating circuit in the fourth embodiment.

FIG. 29 is a block diagram of one of the voltage generating circuits in the fourth embodiment. In FIG. 29, the reference numeral 2901 designates a circuit for switching the AC switching timing.

Reference voltages 2405 of 9 levels VLEV0 to VLEV8 from the electric source circuit 2404 are buffered by the amplification buffer circuits 2601-0 to 2601-8 and supplied to the differential amplification circuits 2602-0 to 2602-8 and the selection circuits 2603-0 to 2603-8 and 2604-0 to 2604-8, respectively. In the differential amplification circuits 2602-0 to 2602-8, the voltages (VLEV0 to VLEV8) are inverted with respect to the reference voltage (VCEN) 2406.

Figure 30:
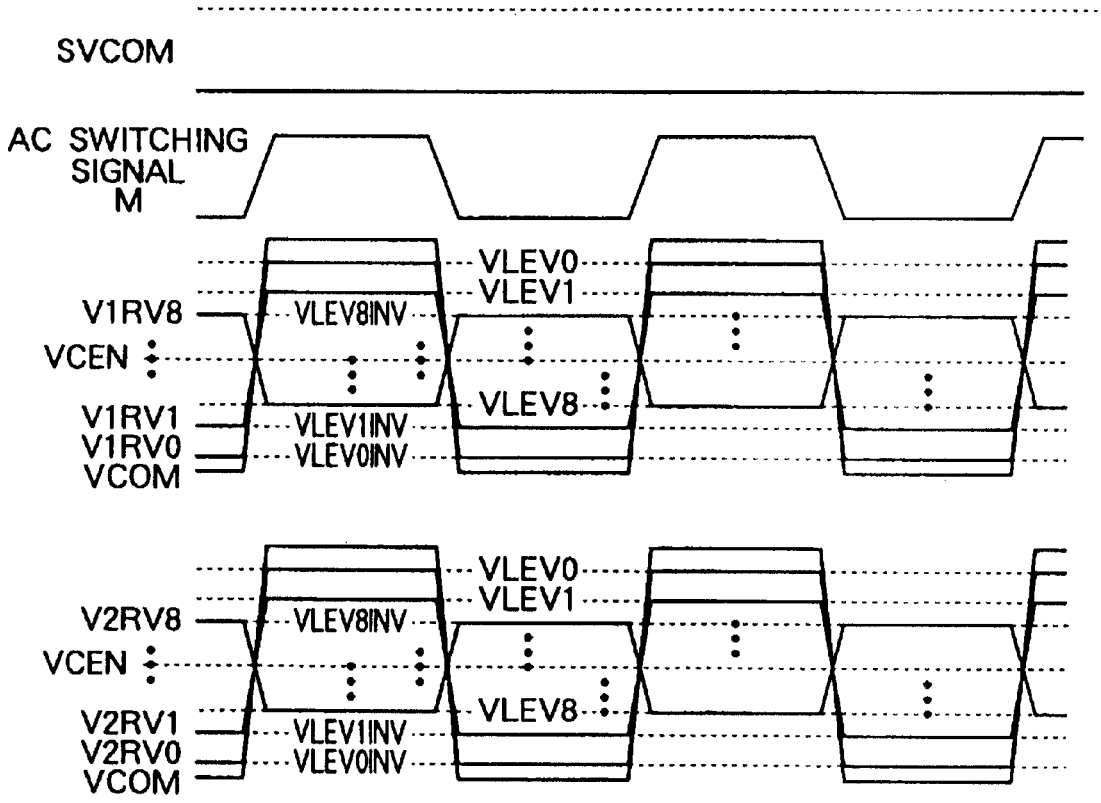
FIG. 30 is a timing chart showing the generation of liquid crystal reference voltages in the fourth embodiment.

FIG. 30 is a timing chart showing the generation of liquid crystal reference voltages in this case. As is obvious from FIG. 30, the voltages VLEV0 to VLEV8 are turned to voltages VLEV0INV to VLEV8INV inverted with respect to the reference voltage VCEN. The selection circuits 2603-0 to 2603-8 and 2604-0 to 2604-8 receive the outputs of the amplification buffer circuits 2601-0 to 2601-8 and the outputs of the differential amplification circuits 2602-0 to 2602-8, respectively, and select these outputs on the basis of the AC switching signal 2403. Because the switching circuit 2901 performs exclusive ORing of the AC switching signal (M) 2403 and the control signal (SVCOM) 2801 and supplies the result of the exclusive ORing to the selection circuits 2604-0 to 2604-8, the polarity of voltages selected by the selection circuits 2603-0 to 2603-8 and the polarity of voltages selected by the selection circuits 2604-0 to 2604-8 are reversed to each other when the level of the control signal (SVCOM) 2801 is high, and the polarity of voltages selected by the selection circuits 2603-0 to 2603-8 and the polarity of voltages selected by the selection circuits 2604-0 to 2604-8 are the same with each other when the level of the control signal (SVCOM) 2801 is low. That is, when the level of the control signal (SVCOM) 2801 is high, the voltage generating timing is the same as that in the third embodiment.

When the level of the control signal (SVCOM) 2801 is low, as shown in FIG. 30, AC reference voltages (V1RV0 to V1RV8) 2419 selected by the selection circuits 2603-0 to 2603-8 are outputted as values VLEV0INV to VLEV8INV and AC reference voltages (V2RV0 to V2RV8) 2420 selected by the selection circuits 2604-0 to 2604-8 are outputted similarly as values VLEV0INV to VLEV8INV as long as the level of the AC switching signal (M) 2403 is high, whereas AC reference voltages (V1RV0 to V1RV8) 2419 selected by the selection circuits 2603-0 to 2603-8 are outputted as values VLEV0 to VLEV8 and AC reference voltages (V2RV0 to V2RV8) 2420 selected by the selection circuits 2604-0 to 2604-8 are outputted similarly as values VLEV0 to VLEV8 as long as the level of the AC switching signal (M) 2403 is low. In the case of common electrode AC drive, it is necessary to make the AC switching timing of the respective outputs of the data driver equal for AC switching the common electrode (VCOM) as shown in FIG. 30. Accordingly, the timing of AC switching on the AC reference voltages 2419 and 2420 can be controlled by switching the control signal 2801, so that the present invention can be adapted to common electrode drive easily.

Figure 31:
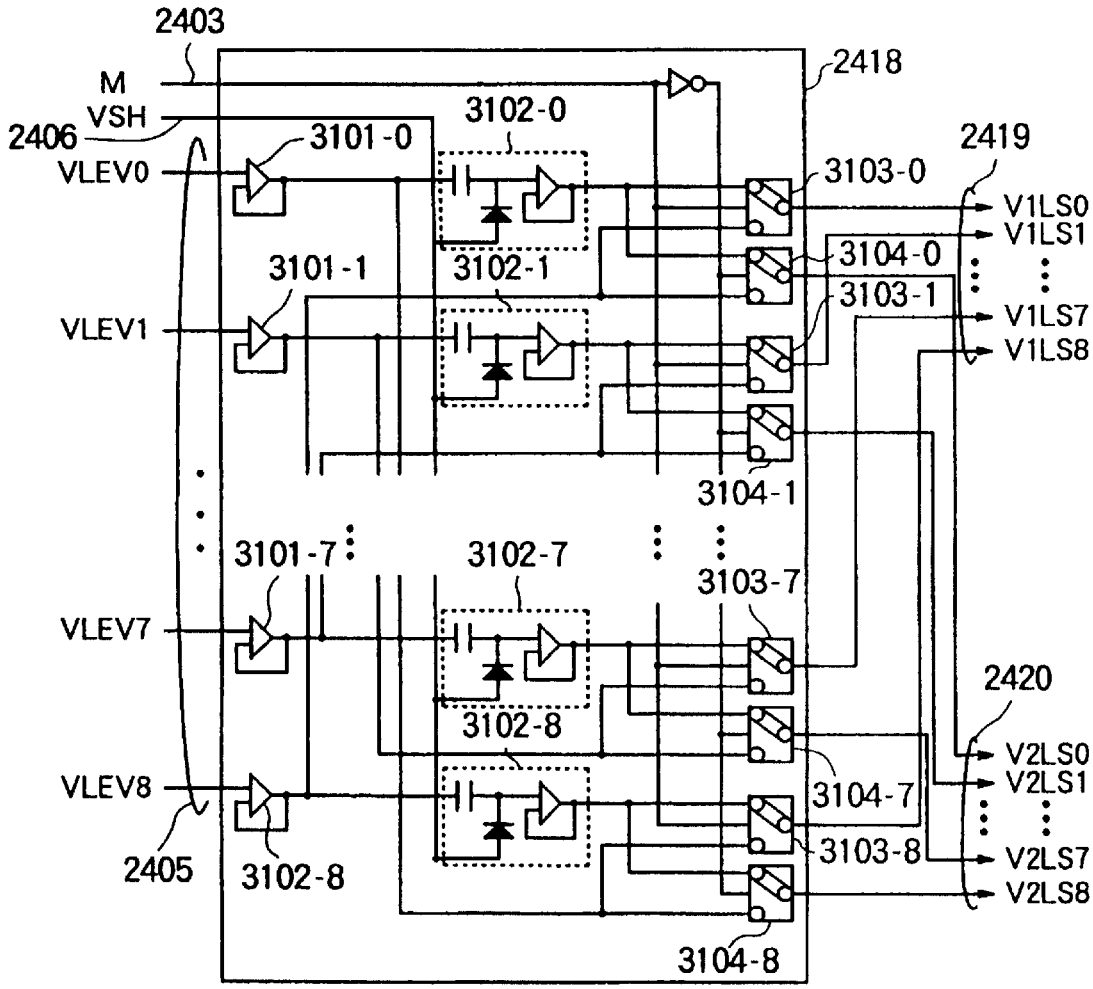
FIG. 31 is a configuration diagram of a voltage generating circuit according to a fifth embodiment of the present invention.

A fifth embodiment of the present invention will be described below. This embodiment is similar to the third embodiment except that voltage generating circuits used in this embodiment are different from those in the third embodiment. FIG. 31 is a block diagram of one of the voltage generating circuits.

In FIG. 31, the reference numerals 3101-0 to 3101-8 designate amplification buffer circuits; 3102-0 to 3102-8, level-shift circuits; and 3103-0 to 3103-8 and 3104-0 to 3104-8, selection circuits.

Reference voltages 2405 of 9 levels VLEV0 to VLEV8 from the electric source circuit 2404 are buffered by the amplification buffer circuits 3101-0 to 3101-8 and supplied to the level-shift circuits 3102-0 to 3102-8 and the selection circuits 3103-0 to 3103-8 and 3104-0 to 3104-8, respectively. In the level-shift circuits 3102-0 to 3102-8, the levels of the reference voltages (VLEV0 to VLEV8) 2405 are shifted correspondingly to the voltage level of the reference voltage (VSH) 2406.

Figure 32:
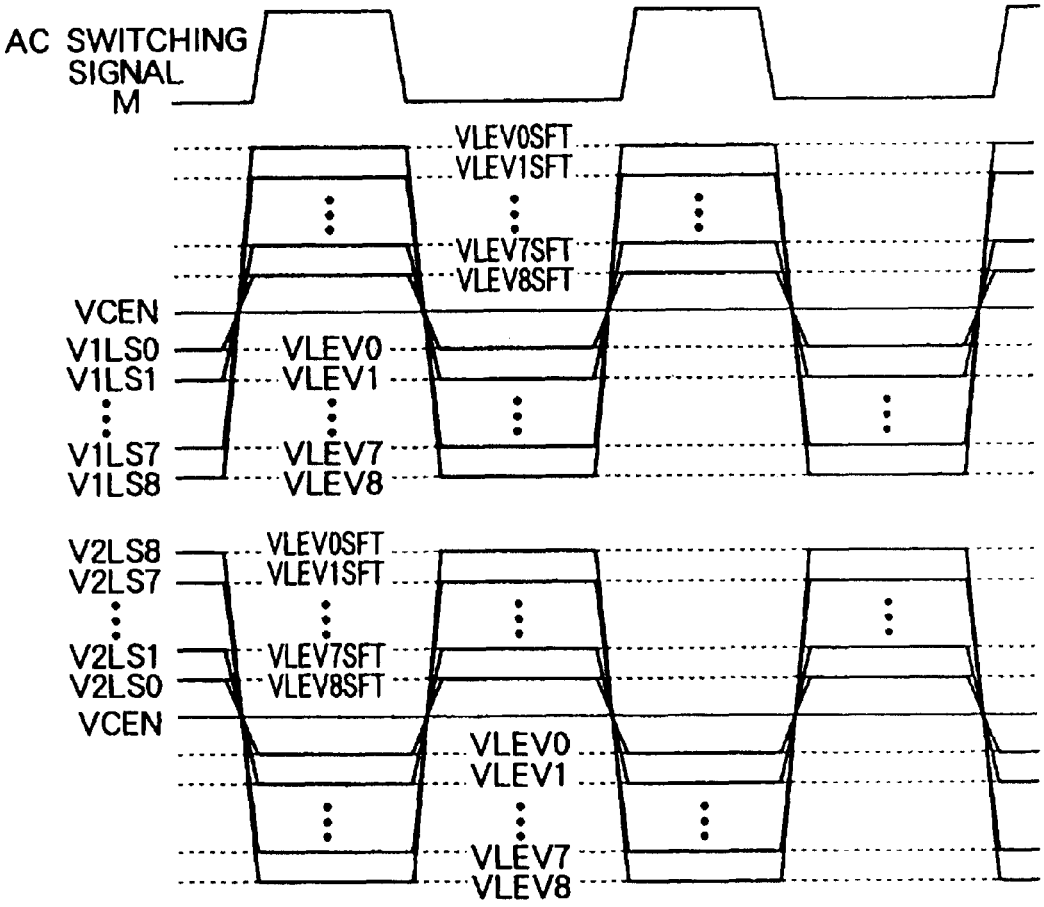
FIG. 32 is a timing chart showing the generation of liquid crystal reference voltages in the fifth embodiment.

FIG. 32 shows the timing of reference voltages and liquid crystal driving voltages. The voltages VLEV0 to VLEV8 are turned to voltages VLEV0SFT to VLEV8SFT having levels shifted by the voltage level VSH, respectively. The selection circuits 3103-0 to 3103-8 and 3104-0 to 3104-8 receive the outputs of the amplification buffer circuits 3101-8 to 3101-0 and the outputs of the level-shift circuits 3012-0 to 3102-8, respectively, and select these outputs on the basis of the AC switching signal 2403. Because inverted AC switching signals are supplied to the selection circuits 3104-0 to 3104-8, the polarity of voltages selected by the selection circuits 3013-0 to 3103-8 and the polarity of voltages selected by the selection circuits 3104-0 to 3104-8 are reversed to each other. When the level of the AC switching signal (M) 2403 is high. AC reference voltages (V1LS0 to V1LS8) 2419 selected by the selection circuits 3103-0 to 3103-8 are outputted as values VLEV8SFT to VLEV0SFT, respectively, and AC reference voltages (V2LS0 to V2LS8) 2420 selected by the selection circuits 3104-0 to 3104-8 are outputted as values VLEV0 to VLEV8, respectively.

When the level of the AC switching signal (M) 2403 is contrariwise low, AC reference voltages (V1LS0 to V1LS8) 2419 selected by the selection circuits 3103-0 to 3103-8 are outputted as values VLEV0 to VLEV8, respectively, and AC reference voltages (V2LS0 to V2LS8) 2420 selected by the selection circuits 3104-0 to 3104-8 are outputted as values VLEV8SFT to VLEV0SFT, respectively. In this manner, AC reference voltages 2419 and 2420 different in AC switching timing from each other are generated.

Next, the operation of the liquid crystal driving circuit 2421 is the next as in the third embodiment. In the configuration as described above, the data drivers can generate liquid crystal driving voltages different in AC switching timing correspondingly to each output, so that alternate-column inversion drive of the liquid crystal panel 2425 can be achieved.

A sixth embodiment of the present invention will be described below.

Figure 33:
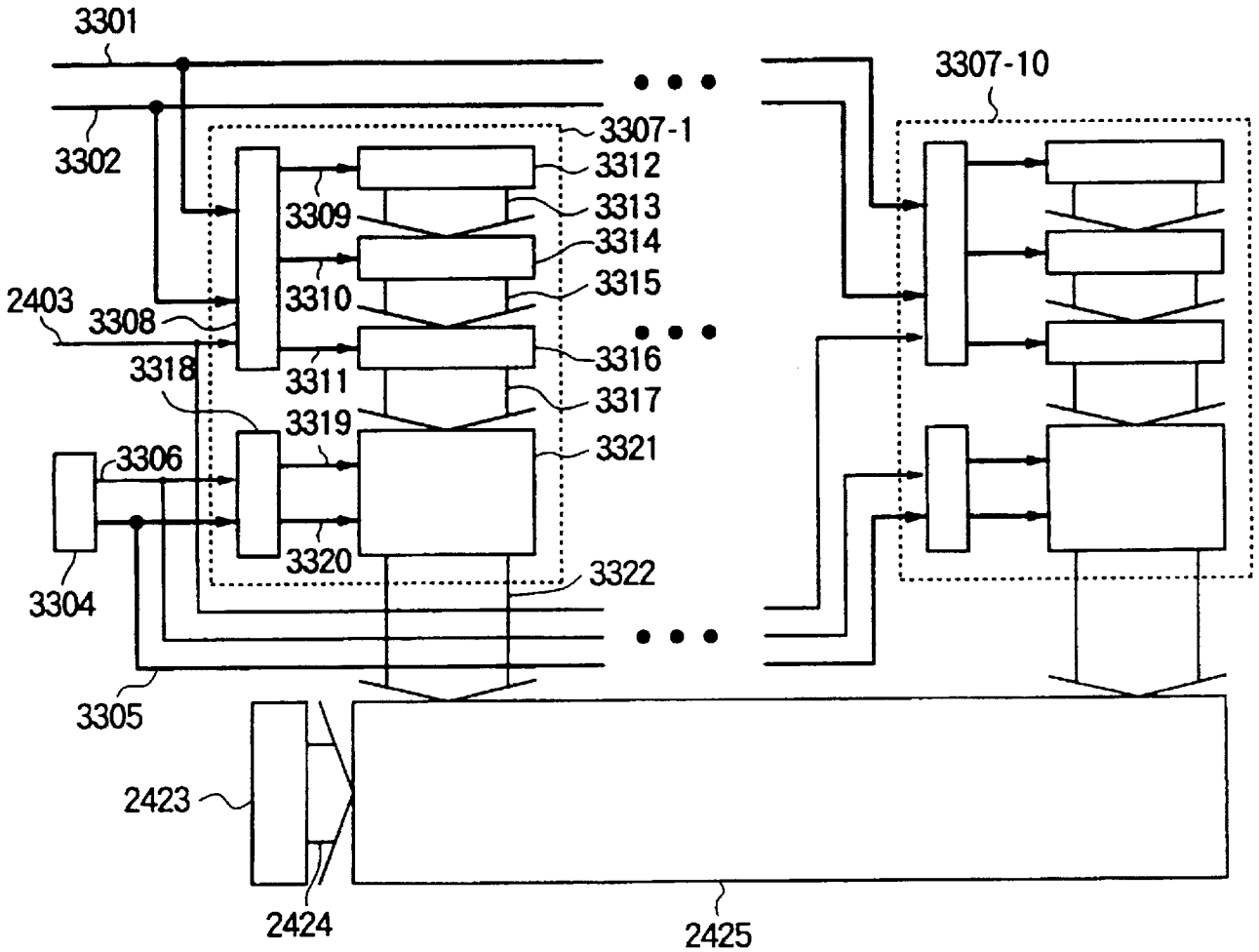
FIG. 33 is a configuration diagram of a liquid crystal display device according to a sixth embodiment of the present invention.

FIG. 33 is a block diagram showing a liquid crystal display device. In FIG. 33, the reference numeral 3301 designates display data transferred from a system; 3302, a group of control signals; 3303, an AC switching signal expressing the timing of AC switching; 3304, an power supply circuit for generating reference voltages which are used for generating liquid crystal driving voltages; and 3305 and 3306, DC reference voltages generated by the electric source circuit 3330-4. The reference numeral 3307-1 to 3307-10 designate data drivers each of which has 192 outputs. In each of the data drivers, the reference numeral 3308 designates a timing control circuit; 3309, a group of timing signals; 3310, a data bus for display data and AC switching signal; 3311, a timing signal expressing the display timing; 3312, a latch address control circuit; 3313, a group of latch signals generated by the latch address control circuit 3312; 3314, a latch circuit for latching data through the data bus 3310 successively; 3315, a data bus for display data latched by the latch circuit 3314 and AC switching signal; 3316, a latch circuit for latching data through the data bus 3315 simultaneously on the basis of the timing signal 3311; and 3317, a data bus for display data latched by the latch circuit 3316 and AC switching signal.

The reference numeral 3318 designates a voltage generating circuit for generating AC reference voltages which are used for AC driving the liquid crystal on the basis of the reference voltage 3305 and 3306; and 3319 and 3320, positive-polarity and negative-polarity reference voltages generated by the voltage generating circuit. The reference numeral 3321 designates a liquid crystal driving circuit for generating liquid crystal driving voltages corresponding to the data bus 3317 for display data and AC switching signal on the basis of the reference voltages 3319 and 3320; and 3322, liquid crystal driving voltages generated by the liquid crystal driving circuit 3321. The reference numeral 3323 designates a scanning circuit; 3324, gate driving signals successively selected by the scanning circuit 3323; and 3325, a liquid crystal panel.

Ten data drivers are required because the number of outputs from each of the data drivers 3307-1 to 3307-10 is 192 and because the resolution of the liquid crystal panel 2425 is 640×RGB×480 pixels. The display data 3301 which are 18-bit data (3 pixels×6 bits for gray scales), and the AC switching signal 3303 composed of 3 bits per 3 pixels, are transferred successively, so that latch signals 3313 synchronized with the display data 3301 and the AC switching signal 3303 are generated by the latch address control circuits 3312 on the basis of the control signal group 3309 to thereby latch the data from the data bus 3310 into the latch circuits 3314 successively. Each of the latch circuits 3314 has latch circuits for latching 192 pixels (6 bits for display data and 1 bit for AC switching signal per one pixel) so that display data and AC switching signal corresponding to one horizontal line can be latched successively in the data drivers 3307-1 to 3307-10.

The display data and AC switching signal latched by the latch circuits 3314 correspondingly to one horizontal line are latched simultaneously through the data bus 3315 by the latch circuits 3316 on the basis of the timing signal 3311 synchronized with the gate selection signal 3324 of the scanning circuit 3323. The data bus 3317 thus latched is supplied to the liquid crystal driving circuits 3321. The voltage generating circuits 3318 generate different AC reference voltages 3319 and 3320 corresponding to two levels of AC switching on the basis of the reference voltages 3305 and 3306 generated by the electric source circuit 3304 and supply the AC reference voltages 3319 and 3320 to the liquid crystal driving circuits 3321, respectively. The liquid crystal driving circuits 3321 generate liquid crystal driving voltages 3322 corresponding to the display data 3317 on the basis of the AC reference voltages 3319 and 3320 to thereby drive the liquid crystal panel 3325.

Figure 34:
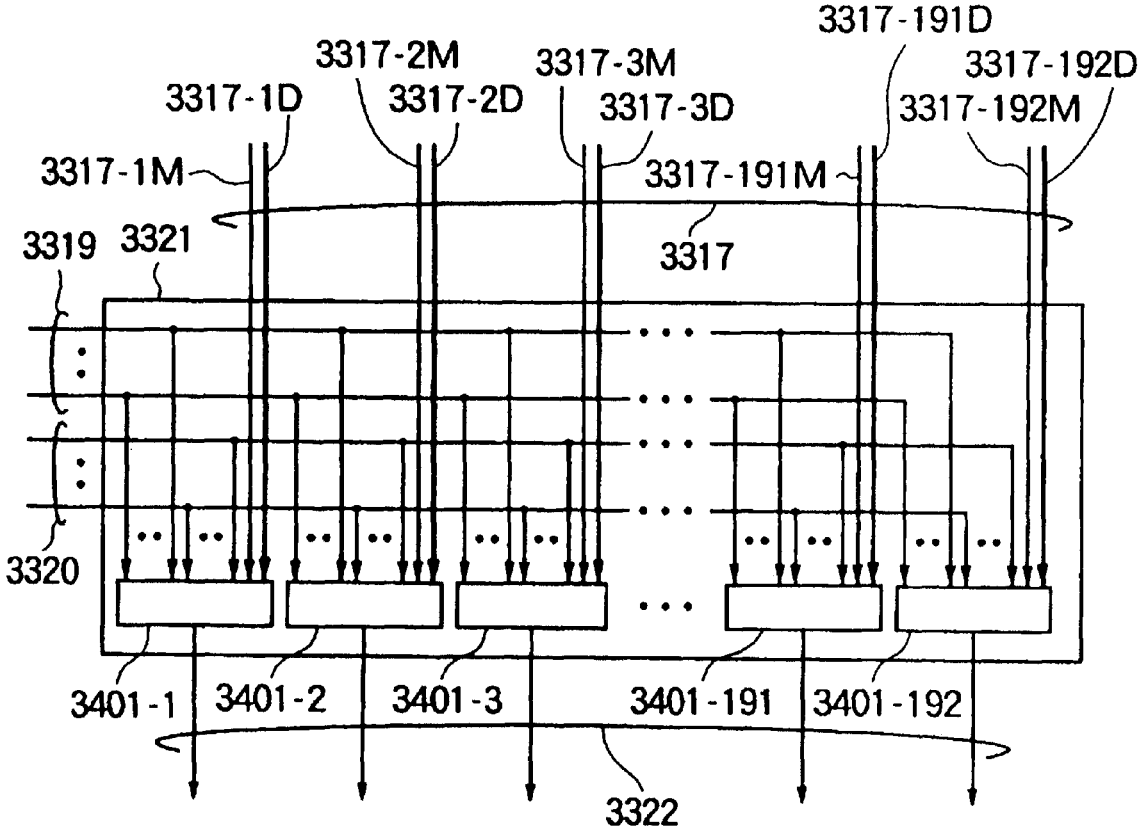
FIG. 34 is a block diagram of the liquid crystal driver circuit in the sixth embodiment.

FIG. 34 is a block diagram of one of the liquid crystal driving circuits. In FIG. 34, the reference numerals 3401-1 to 3401-192 designate liquid crystal driving circuits for respective outputs; 3317-1M to 3317-192M, AC switching signals for respective outputs with respect to the data bus 3317; and 3317-1D to 3317-192D, display data for respective outputs.

The AC reference voltages 3319 and 3320 are supplied to the liquid crystal driving circuits 3401-1 to 3401-192 for 192 outputs, respectively. Each of the liquid crystal driving circuits 3401-1 to 3401-192 generates 64 levels of liquid crystal driving voltages on the basis of the data bus 3317 containing 6-bit display data and AC switching signal per one output and the 9 levels of AC reference voltages 3319 or 3320. The 64 levels of liquid crystal driving voltages can be outputted by selecting either AC reference voltage 3319 or AC reference voltage 3320 as an AC switching signal, selecting 2 levels from the 9 levels of AC reference voltages with use of upper 3 bits of the 6-bit display data and then selecting one level from 8 levels of voltages obtained by dividing the selected two levels of voltages into 8 equal parts with use of lower 3 bits of the display data.

Figure 35:
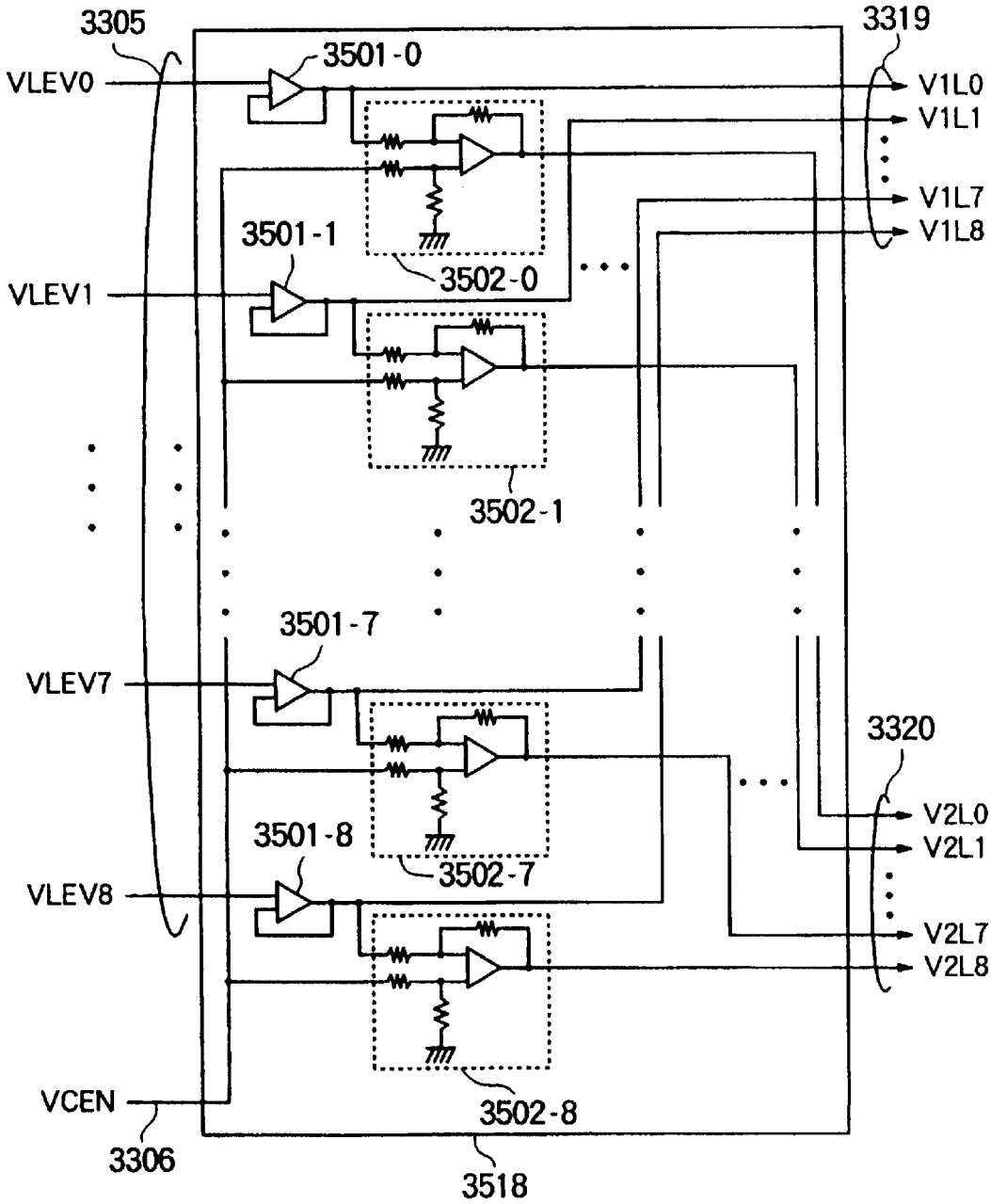
FIG. 35 is a configuration diagram of the voltage generating circuit in the sixth embodiment.

FIG. 35 is a block diagram of one of the voltage generating circuits. Reference voltages 3305 of 9 levels VLEV0 to VLEV8 from the electric source circuit 3304 are buffered by the amplification buffer circuits 3501-0 to 3501-8, supplied to the differential amplification circuits 3502-0 to 3502-8 and then outputted as reference voltages V1L0 to V1L8, respectively. In the differential amplification circuits 3502-0 to 3502-8, the reference voltages (VLEV0 to VLEV8) 3305 are inverted with respect to the reference voltage (VCEN) 3306 and outputted as reference voltages V2L0 to V2L8, respectively. The voltages VLEV0 to VLEV8 are buffered and outputted as reference voltages V1L0 to V1L8 and outputted as reference voltages V2L0 to V2L8 inverted with respect to VCEN, respectively.

Figure 36:
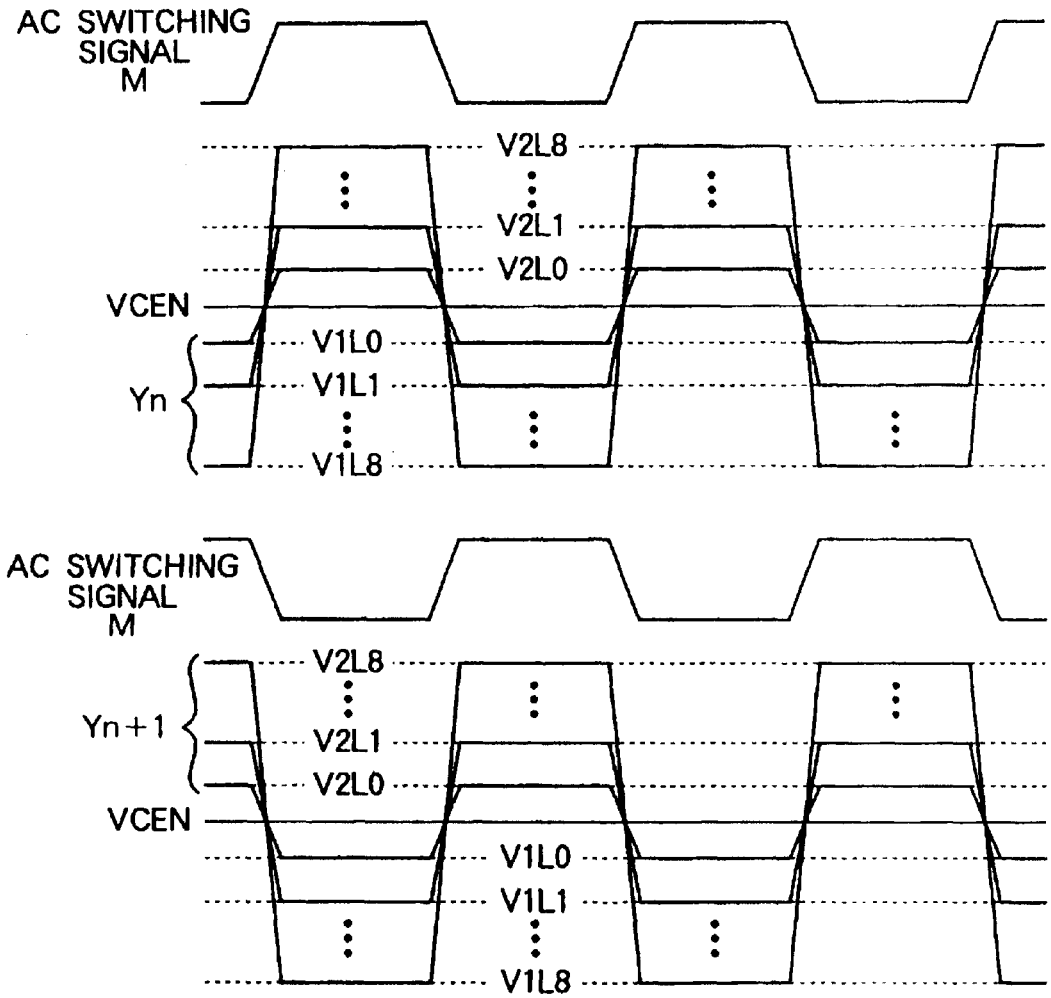
FIG. 36 is a timing chart showing the generation of liquid crystal reference voltages in the sixth embodiment.

FIG. 36 shows the timing of reference voltage and liquid crystal driving voltage. Liquid crystal driving voltages are generated correspondingly to AC switching signals by inverting the AC switching signals in the n-th output terminal Yn and in the (n+1)-th output terminal Yn+1 to each other. That is, when an output terminal Yn generates a liquid crystal driving voltage corresponding to the AC reference voltage 3319 (V1L0 to V1L8), the next output terminal Yn+1 generates a liquid crystal driving voltage corresponding to the AC reference voltage 3320 (V2L0 to V2L8). When the output terminal Yn generates a liquid crystal driving voltage corresponding to the AC reference voltage 3320 (V2L0 to V2L8), the next output terminal Yn+1 generates a liquid crystal driving voltage corresponding to the AC reference voltage 3319 (V1L0 to V1L8).

In the configuration as described above, the data drivers can generate liquid crystal driving voltages different in AC switching timing for respective outputs, so that alternate-column inversion drive of the liquid crystal panel 3325 can be achieved. Further, the AC switching timing can be changed easily once per two outputs, once per a plurality of outputs, once per one line, or the like, by changing the setting of the AC switching signal transferred in synchronism with display data.

Figure 37:
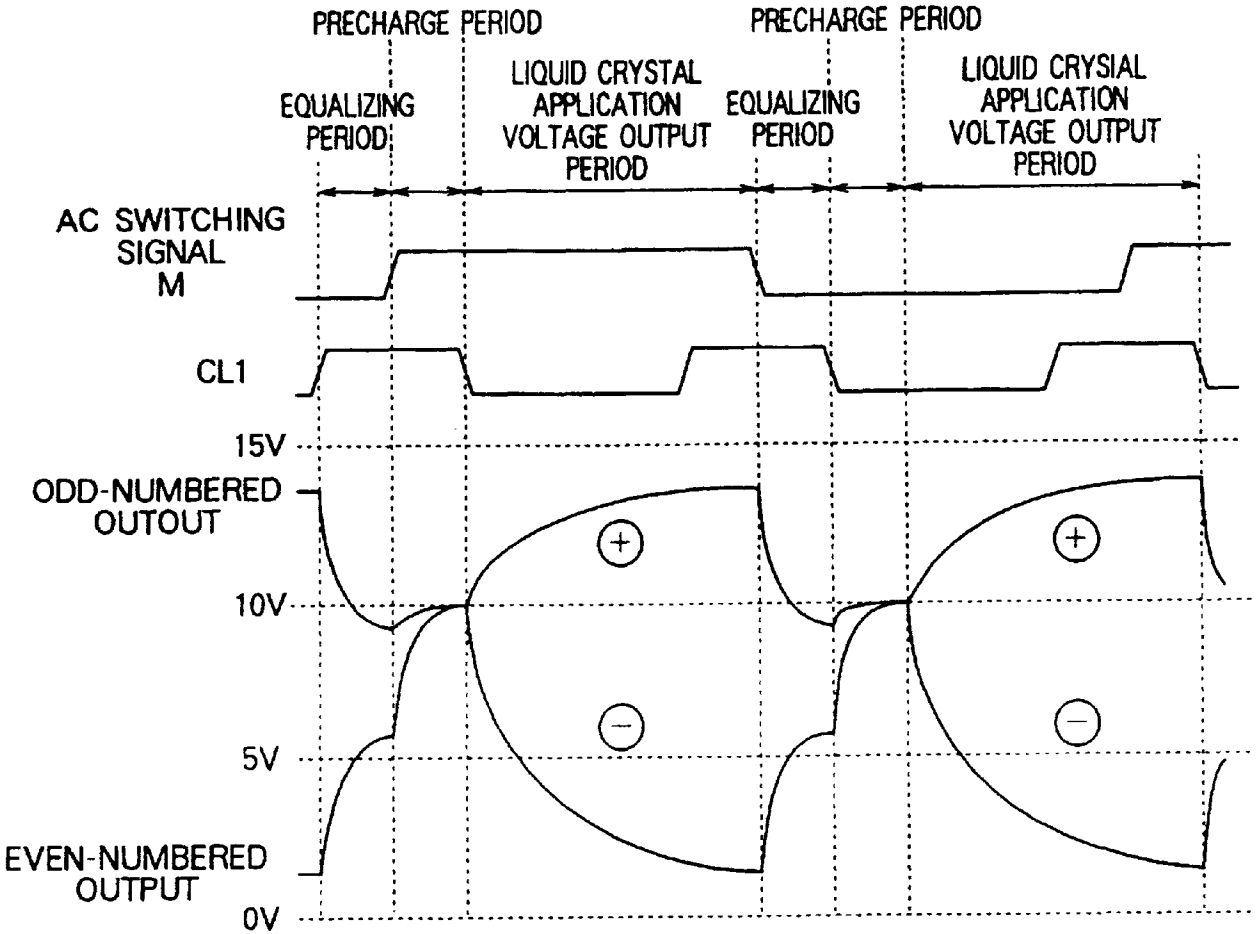
FIG. 37 is a timing chart showing liquid crystal AC output voltages according to a seventh embodiment of the present invention.
Figure 38:
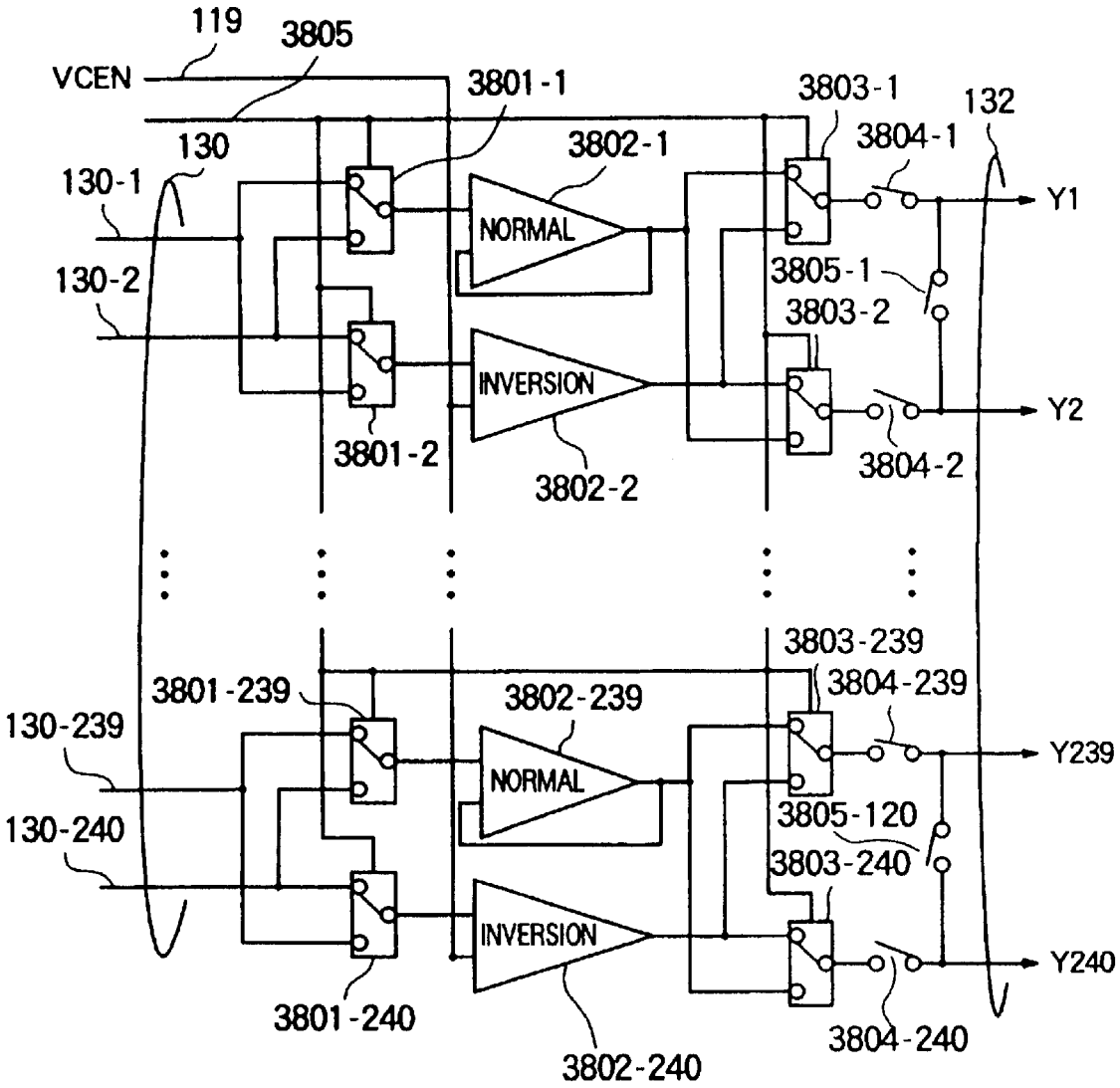
FIG. 38 is a block diagram of the output circuit in the seventh embodiment.

Further, as a seventh embodiment of the present invention, there is shown an embodiment of the output circuit for attaining saving of consumed electric power and reduction of chip size in the first and second embodiments. This embodiment is different from the first and second embodiments only in the output circuit. FIG. 37 is a timing chart showing the timing of output waveforms, and FIG. 38 is a block diagram of the output circuit.

In the first and second embodiments, a combination of a normal amplification circuit and an inversion amplification circuit is required for each output. On the contrary, in this embodiment, a combination of a normal amplification circuit and an inversion amplification circuit is used so as to be common to two outputs, so that the chip size can be reduced. In FIG. 38, the reference numerals 3801-1 to 3801-240 designate selectors which select gray scale voltages correspondingly to adjacent outputs of gray scale voltages 130-1 to 130-240. The reference numerals 3802-1 to 3802-240 designate normal amplification circuits and inversion amplification circuits which pass or invert the gray scale voltages selected by the corresponding selectors 3801. The reference numerals 3803-1 to 3803-240 designate selectors each of which selects one from outputs of adjacent amplification circuits 3802. These operations will be described below in conjunction with output terminals Y1 and Y2. A gray scale voltage 130-1 corresponding to the output terminal Y1 and a gray scale voltage 130-2 corresponding to the output terminal Y2 are supplied to the normal amplification circuit 3802-1 or the inversion amplification circuit 3802-2 through the selectors 3801-1 and 3801-2, respectively. Further, the outputs of the normal amplification circuit 3802-1 and the inversion amplification circuit 3802-2 are selected by the selectors 3803-1 and 3803-2, respectively, and outputted to the output terminals Y1, Y2. A selection signal 3805 for the selectors 3801 and 3803 is a selection signal switched in synchronism with the AC switching signal 106. Therefore, when the gray scale voltage 130-1 corresponding to the output terminal Y1 is normally supplied to the output terminal Y1, the gray scale voltage 130-2 corresponding to the output terminal Y2 is inverted with respect to the inversion reference voltage 119 and then supplied to the output terminal Y2. When the gray scale voltage 130-1 corresponding to the output terminal Y1 is contrariwise inverted with respect to the inversion reference voltage 119 and then supplied to the output terminal Y1, the gray scale voltage 130-2 corresponding to the output terminal Y2 is normally supplied to the output terminal Y2. In this manner, liquid crystal driving voltages which are inverted to each other in AC switching timing can be supplied to adjacent output terminals.

Further, as shown in FIG. 37, before liquid crystal supply voltages are outputted, an equalizing period in which adjacent output terminals are connected by the switching circuits 3805-1 to 3805-120 while the outputs are turned into a high impedance state by the switching circuits 3804-1 to 3804-240 is provided so that an operation in which precharging to the level of 10 V is assisted by positive-polarity and negative-polarity electric charge on data lines of the liquid crystal panel is carried out. In this manner, liquid crystal driving power can be reduced by using electric charge remaining in the liquid crystal panel.

What is claimed is:

[1. A liquid crystal driver comprising:

a plurality of output terminals for outputting display voltages to be applied to a liquid crystal display device;

an input terminal for receiving display data corresponding to said plurality of output terminals; and output means for converting said input display data into said output display voltages;

wherein said output means selects a display voltage level corresponding to one input display data and simultaneously generates two different display voltages from the selected display voltage level so that either one of said two different display voltages can be selected as an output display voltage for each of said output terminals.]

[2. A liquid crystal driver according to claim 1, wherein said two different display voltages are a display voltage higher than a reference voltage and a display voltage lower than the reference voltage.]

[3. A liquid crystal driver according to claim 1, wherein a display voltage to be selected from said two different display voltages is determined on the basis of a signal received from outside the liquid crystal driver.]

[4. A liquid crystal driver according to claim 1, wherein a display voltage to be selected from said two different display voltages is determined on the basis of input information received together with the display data.]

[5. A liquid crystal driver according to claim 2, wherein said two different display voltages are inverted relative to each other so as to be symmetric relative to each other with respect to said reference voltage.]

[6. A liquid crystal driver according to claim 2, wherein one of said two different display voltages is shifted by an amount corresponding to said reference voltage compared with another one of said two different display voltages.]

[7. A liquid crystal driver according to claim 1, wherein said output means includes level-shift means for shifting said output display voltages with respect to said output terminals.]

[8. A liquid crystal driver according to claim 1, wherein a signal obtained by periodically switching between said two different display voltages is outputted at each of said output terminals.]

[9. A liquid crystal driver according to claim 2, wherein during a certain period, a display voltage higher than said reference voltage and a display voltage lower than said reference voltage are respectively supplied to two arbitrary adjacent output terminals.]

[10. A liquid crystal driver according to claim 1, wherein the liquid crystal driver is constituted by one LSI.]

[11. A liquid crystal display device comprising:

a liquid crystal panel including pixel portions which are arranged at positions of intersections of a plurality of data lines and a plurality of scanning lines in the form of a matrix;

a scanning driver for successively supplying voltages to said plurality of scanning lines; and a liquid crystal driver as defined in claim 1 for receiving display data and supplying display voltages to said plurality of data lines in correspondence to said display data.]

[12. A liquid crystal display device according to claim 11, wherein said scanning driver includes a level-shift circuit for receiving an input signal of a same level as a level of a signal received by said liquid crystal driver, and shifting the level of said input signal to a level allowed to be used in said scanning driver.]

[13. A liquid crystal driver according to claim 1, wherein said output means includes two different-characteristic output amplification circuits for two adjacent output terminals so that said two different display voltages can be selected and outputted by switching connections between two gray scale voltage data generated on the basis of input display data corresponding to said two output terminals and input terminals of said two output amplification circuits, and connections between output terminals of said two output amplification circuits and said two output terminals on the basis of an external signal.]

[14. A liquid crystal driver according to claim 1, wherein said output means includes a combination of a non-inversion output amplification circuit and an inversion output amplification circuit for two adjacent output terminals so that said two different display voltages can be alternately outputted by alternately switching connections between two gray scale voltage data generated on the basis of input display data corresponding to said two output terminals and input terminals of said combination of output amplification circuits, and connections between output terminals of said combination of output amplification circuits and said two output terminals on the basis of an external signal.]

[15. A liquid crystal driver according to claim 9, wherein said output means includes connection means which connects together two adjacent output terminals outputting a display voltage higher than said reference voltage and a display voltage lower than said reference voltage so that said two adjacent output terminals are connected together during a predetermined period before output display voltages of the two adjacent output terminals are switched.]

[16. A method of applying display voltages to a liquid crystal display device, the method comprising the steps of:

receiving display data corresponding to output terminals which output display voltages;

generating gray scale display voltage levels on the basis of reference voltages;

selecting one of the gray scale display voltage levels for each output terminal in accordance with said display data, the selected gray scale display voltage level being a first display voltage for the output terminal;

supplying an AC switching signal and an inversion reference voltage, said AC switching signal having a polarity which is periodically inverted;

inverting said selected gray scale voltage level with respect to said inversion reference voltage to generate an inverted selected gray scale display voltage level, the inverted selected gray scale display voltage level being a second display voltage for the output terminal, the second display voltage being different from the first display voltage, the first display voltage and the second display voltage being available simultaneously;

selecting one of the first display voltage and the second display voltage in accordance with the AC switching signal as an output display voltage for the output terminal; and outputting the output display voltage from the output terminal.]

*17. A display device comprising:*

*a display panel for displaying an image in accordance with display data; and*

*a driver being arranged on a single side of said display panel;*

*wherein said driver includes:*

*a first circuit for generating a plurality of first voltages and a plurality of second voltages and for simultaneously outputting said first and second voltages, said first voltage corresponding to respective gray scales and said second voltages having inverted polarity of said first display voltages; and*

*a second circuit for selecting driving voltages from said first and second voltages according to said display data and for outputting said selected driving voltages to said display panel; and*

*wherein said selected driving voltages which correspond to adjacent two outputs of said second circuit have different polarity from each other, and voltages which correspond to adjacent two pixels in a line direction of said display panel have different polarity from each other.*

*18. The display device according to claim 17, wherein said first circuit includes differential amplifiers, and each of said differential amplifiers generates one of said second voltages by inverting the polarity of one of said first voltages.*

*19. The display device according to claim 17, wherein said second circuit includes a plurality of driving circuits arranged for respective columns of said display panel, and one of any adjacent two of said driving circuits is applied with either one of said first voltages and said second voltages while the other one of said adjacent two driving circuits is applied with the other one of said first voltages and second voltages.*

*20. The display device according to claim 19, wherein said driver includes a third circuit for switching between said first voltages and said second voltages applied to said one of adjacent two driving circuits and between said second voltages and said first voltage applied to said other one of adjacent two driving circuits according to an AC switching signal.*

*21. The display device according to claim 17, wherein voltages of pixels on adjacent two lines in a column direction of said display panel have different polarity from each other.*

*22. The display area according to claim 21, wherein the polarity of the voltage of each pixel is inverted at intervals of one frame time.*

*23. A display device comprising:*

*a display panel for displaying an image in accordance with display data; and*

*a driver being arranged on a single side of said display panel;*

*wherein said driver includes:*

*a first circuit for generating a plurality of first voltages and a plurality of second voltages and for simultaneously outputting said first and second voltages, said first voltages corresponding to respective gray scales and said second voltages having inverted polarity of said first display voltages; and*

*a second circuit for selecting driving voltages from said first and second voltages according to said display data and for outputting selected driving voltages to said display panel; and*

*wherein a polarity of said driving voltages of odd column outputs of said second circuit is different from a polarity of said driving voltages of even column outputs of said second circuit, and a polarity of voltages of odd column pixels of said display panel is different from a polarity of voltages of even column pixels of a same line of said display panel.*

*24. The display device according to claim 23, wherein said first circuit includes differential amplifiers, and each of said differential amplifiers generates one of said second voltages by inverting the polarity of one of said first voltages.*

*25. The display device according to claim 23, wherein said second circuit includes a plurality of driving circuits arranged for respective columns of said display panel, said driving circuits for odd columns are applied with either one of said first voltages and said second voltages while said driving circuits for even columns are applied with the other one of said first voltages and said second voltages.*

*26. The display device according to claim 25, wherein said driver includes a third circuit for switching between said first voltages and said second voltages applied to said odd column driving circuits and between said second voltages and said first voltage applied to said odd column driving circuits according to an AC switching signal.*

*27. The display device according to claim 23, wherein a polarity of voltages which correspond to odd line pixels of said display panel is different from a polarity of voltages which correspond to even line pixels on a same column of said display panel.*

*28. The display device according to claim 27, wherein the polarity of the voltage of each pixel is inverted at intervals of one frame time.*

*29. A display device comprising:*

*a display panel for displaying an image in accordance with display data; and*

*a driver being arranged on a single side of said display panel;*

*wherein said driver includes:*

*a first circuit for generating a plurality of first voltages and a plurality of second voltages and for simultaneously outputting said first and second voltages, said first voltages corresponding to respective gray scales and said second voltages having inverted polarity of said first display voltages; and*

*a second circuit for selecting driving voltages from said first and second voltages according to said display data and outputting said selected driving voltages to said display panel; and*

*wherein said selected driving voltages which correspond to adjacent two group outputs of said second circuit have different polarity from each other, and voltages which correspond to adjacent two groups, each group including a plurality of pixels, in a line direction of said display panel, have different polarity from each other.*

*30. The display device according to claim 29, wherein said first circuit includes differential amplifiers, and each of said differential amplifiers generates one of said second voltages by inverting the polarity of one of said first voltages.*

*31. The display device according to claim 29, wherein said second circuit includes a plurality of driving circuits arranged for respective columns of said display panel, one of any adjacent two groups of said driving circuits is applied with either one of said first voltage and said second voltages while the other one group of said adjacent two group driving circuits is applied with the other one of said first voltages and said second voltages.*

*32. The display device according to claim 31, wherein said driver includes a third circuit for switching between said first voltages and said second voltages applied to said one of adjacent two groups driving circuits and between said second voltages and said first voltage applied to said other one of adjacent two groups driving circuits according to an AC switching signal.*

*33. The display device according to claim 29, wherein voltages of pixels on adjacent two lines in a column direction of said display panel have different polarity from each other.*

*34. The display device according to claim 33, wherein the polarity of the voltage of each pixel is inverted at intervals of one frame time.*

* * * * *